US012748500B2

(12) United States Patent
Kim et al.

(10) Patent No.: US 12,748,500 B2
(45) Date of Patent: Sep. 29, 2026

(54) IMAGE DISPLAY DEVICE FOR DISPLAYING VIRTUAL REALITY IMAGE, AND DISPLAY METHOD THEREFOR

(71) Applicant: Samsung Electronics Co., Ltd., Suwon-si (KR)

(72) Inventors: Dongwook Kim, Suwon-si (KR); Dongkeun Kang, Suwon-si (KR); Jungseop Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/090,172

(22) Filed: Mar. 25, 2025

(65) Prior Publication Data

US 2025/0224810 A1 Jul. 10, 2025

Related U.S. Application Data

(63) Continuation of application No. PCT/KR2023/011010, filed on Jul. 28, 2023.

(30) Foreign Application Priority Data

Sep. 29, 2022 (KR) ........................ 10-2022-0124665
Nov. 30, 2022 (KR) ........................ 10-2022-0165104

(51) Int. Cl.
*G06F 3/01* (2006.01)

(52) U.S. Cl.
CPC .............. *G06F 3/017* (2013.01); *G06F 3/011* (2013.01)

(58) Field of Classification Search
CPC .......... G06F 3/011; G06F 3/013; G06F 3/017; G06F 1/163
See application file for complete search history.

(56) References Cited

U.S. PATENT DOCUMENTS 8,723,792 B2 5/2014 Park et al.
9,462,108 B2 10/2016 Ko et al.
(Continued)

FOREIGN PATENT DOCUMENTS

CN 108898231 A 11/2018
CN 110286744 A 9/2019
(Continued)

OTHER PUBLICATIONS

JP2022088045A Information Processing System, Device Controller and Program Jun. 14, 2022 Hayashi Kohei (Year: 2020).*
(Continued)

*Primary Examiner* — Van N Chow
(74) *Attorney, Agent, or Firm* — Nixon & Vanderhye, P.C.

(57) ABSTRACT

An example image display device may include a display; a sensor unit; a communication unit; a memory; and a processor. The processor may control the sensor unit to obtain a first position of at least one external device, and a second position of a user, control the sensor unit to recognize a gesture of the user with respect to the at least one external device, control the communication unit to transmit, to a server, sensing data associated with the first position, the second position, and the gesture of the user with respect to the at least one external device, control the communication unit to receive, from the server, a first virtual scenario that is selected, based on the sensing data, from among a plurality of virtual scenarios associated with the at least one external device, and control the display to display a virtual reality image that reflects the first virtual scenario.

18 Claims, 20 Drawing Sheets

(56) References Cited

U.S. PATENT DOCUMENTS

| | | | | |
|---|---|---|---|---|
| 10,275,019 | B1 | 4/2019 | Tett | |
| 10,777,015 | B2 * | 9/2020 | Anderson | G06F 3/0346 |
| 11,899,214 | B1 * | 2/2024 | Petrov | G06T 19/006 |
| 2010/0304787 | A1 | 12/2010 | Lee et al. | |
| 2012/0122062 | A1 | 5/2012 | Yang et al. | |
| 2018/0032031 | A1 * | 2/2018 | Du | G06T 19/20 |
| 2019/0056791 | A1 * | 2/2019 | Holz | G06T 7/246 |
| 2021/0304577 | A1 | 9/2021 | Hollar et al. | |
| 2024/0054735 | A1 * | 2/2024 | Daniels | G06F 3/1454 |

FOREIGN PATENT DOCUMENTS

| | | | |
|---|---|---|---|
| CN | 112348964 | A | 2/2021 |
| GB | 2337828 | A | 12/1999 |
| JP | 2022088045 | A | 6/2022 |
| JP | 7514747 | B2 | 7/2024 |
| KR | 19990086080 | A | 12/1999 |
| KR | 20000043370 | A | 7/2000 |
| KR | 100271447 | B1 | 11/2000 |
| KR | 100931403 | B1 | 12/2009 |
| KR | 20100128441 | A | 12/2010 |
| KR | 101017664 | B1 | 2/2011 |
| KR | 20110097305 | A | 8/2011 |
| KR | 101390383 | B1 | 4/2014 |
| KR | 101539466 | B1 | 7/2015 |
| KR | 20160011419 | A | 2/2016 |
| KR | 101609064 | B1 | 3/2016 |
| KR | 20160024272 | A | 3/2016 |
| KR | 20160091609 | A | 8/2016 |
| KR | 20160111284 | A | 9/2016 |
| KR | 101671760 | B1 | 10/2016 |
| KR | 102049506 | B1 | 11/2019 |
| KR | 20200086558 | A | 7/2020 |
| KR | 20210026586 | A | 3/2021 |
| KR | 20210071523 | A | 6/2021 |
| KR | 102276788 | B1 | 7/2021 |

OTHER PUBLICATIONS

KR20100128441A Method for Dispalying Menual in Mobile Terminal and Mobile Terminal Using the Same Dec. 8, 2010 Lee Ho Joon (Year: 2010).*

Information Processing System, Device (Year: 2020).*

Method for Dispalying Menual in Mobile Terminal (Year: 2010).*

International Search Report and Written Opinion of the ISA for PCT/KR2023/011010 mailed Oct. 27, 2023, 14 pages.

* cited by examiner

IMAGE DISPLAY DEVICE FOR DISPLAYING VIRTUAL REALITY IMAGE, AND DISPLAY METHOD THEREFOR

CROSS-REFERENCE TO RELATED APPLICATIONS

This application is a continuation of International Application No. PCT/KR2023/011010 designating the United States, filed on Jul. 28, 2023, in the Korean Intellectual Property Receiving Office and claiming priority to Korean Patent Application Nos. 10-2022-0124665, filed on Sep. 29, 2022, and 10-2022-0165104 filed on Nov. 30, 2022, in the Korean Intellectual Property Office, the disclosures of each of which are incorporated by reference herein in their entireties.

BACKGROUND

Field

The disclosure relates to an image display device for displaying a virtual reality image, and a display method thereof.

Description of Related Art

Recently, virtual reality images have been used to provide experiences in virtual spaces. Virtual reality images may depict more realistic situations than planar images.

A reconfigurable platform management device for a virtual reality-based training simulator has been proposed, which enables a device platform to be reconfigured to suit various work environments and to fulfill various work scenario requirements of users. A reconfigurable platform management device may output a stereoscopic image of mixed reality content used for work training of a user, and generate sensation feedback that is identical to that generated based on the user's motion with respect to the output stereoscopic image when working with an actual working tool.

While the use of related-art virtual reality images simulates experiences and work environments in virtual spaces, there is currently no technology that provides virtual reality based on the recognition of actual positions and devices. There is a need for technology that uses a virtual reality platform based on positions in an actual space, to enable users to experience a virtual space in their actual space.

SUMMARY

According to an example embodiment of the present disclosure, an image display device may include a display; a sensor unit (e.g., including a sensor); a communication unit (e.g., including a communication circuit); a memory including one or more instructions; and at least one processor configured to execute the one or more instructions. The at least one processor may control the sensor unit to obtain a first position of at least one external device and a second position of a user and recognize a gesture of the user with respect to the at least one external device. The at least one processor may control the communication unit to transmit, to a server, sensing data associated with the first position, the second position, and the gesture of the user with respect to the at least one external device and receive, from the server, a first virtual scenario that is selected, based on the sensing data, from among a plurality of virtual scenarios associated with the at least one external device. The at least one processor may control the display to display a virtual reality image that reflects the first virtual scenario.

According to an example embodiment of the present disclosure, a display method of an image display device may include controlling a sensor unit (e.g. including a sensor) of the image display device to obtain a first position of at least one external device, and a second position of a user and recognize a gesture of the user with respect to the at least one external device. The display method of the image display device may include controlling a communication unit (e.g., including a communication circuit) of the image display device to transmit, to a server, sensing data associated with the first position, the second position, and the gesture of the user with respect to the at least one external device and receive, from the server, a first virtual scenario that is selected, based on the sensing data, from among a plurality of virtual scenarios associated with the at least one external device. The display method of the image display device may include controlling a display of the image display device to display a virtual reality image that reflects the first virtual scenario.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
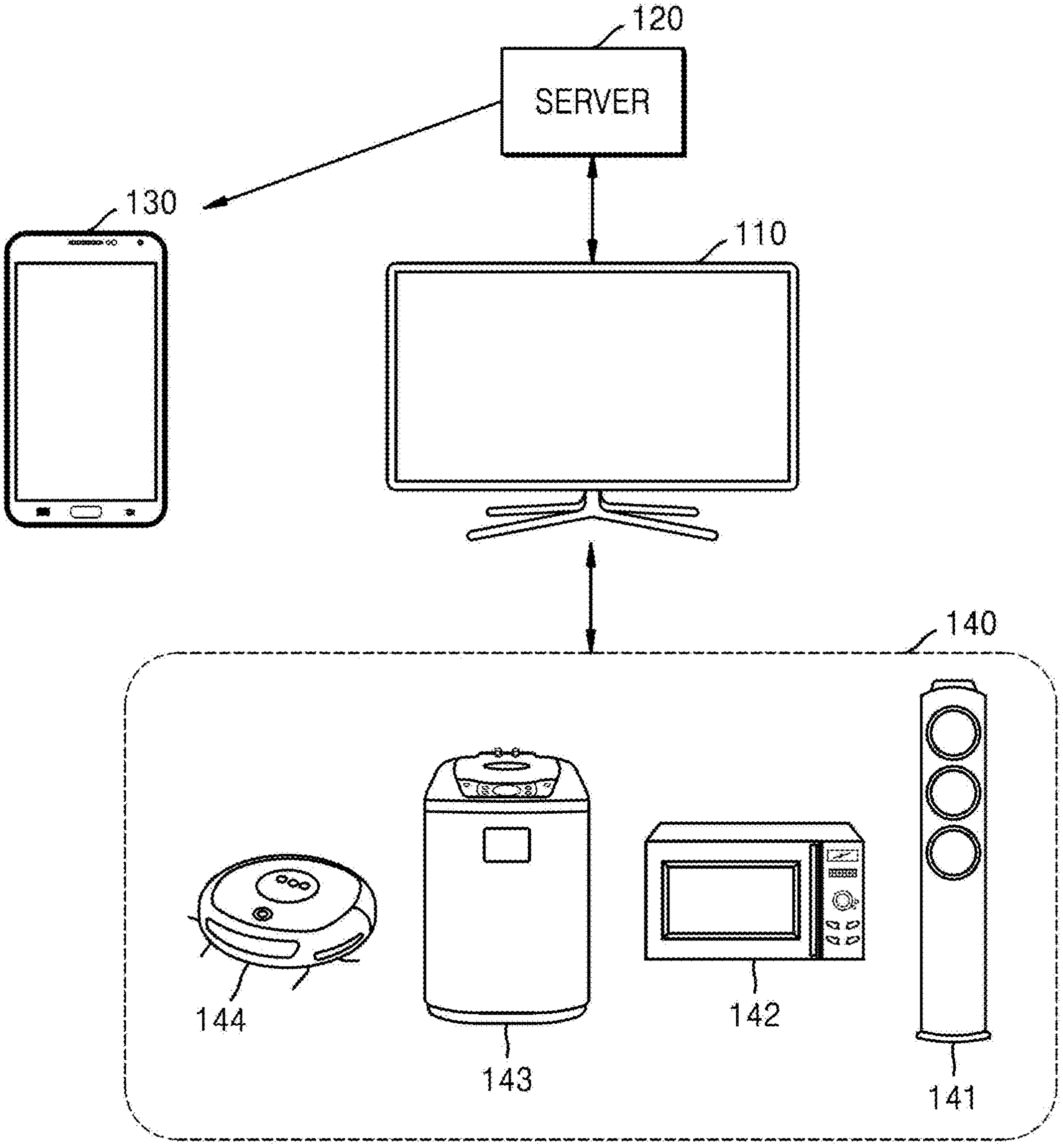
FIG. 1 is a diagram illustrating an example system according to various embodiments of the present disclosure.

Terms used herein will be briefly described, and then example embodiments of the present disclosure will be described in greater detail.

Although the terms used herein are selected from among common terms that are currently widely used in consideration of their functions in example embodiments of the present disclosure, the terms may be different according to an intention of one of ordinary skill in the art, a precedent, or the advent of new technology. Also, in particular cases, the terms are discretionally selected by the applicant of the present disclosure, in which case, the meaning of those terms will be described in detail in the corresponding description of example embodiments of the present disclosure. Therefore, the terms used herein are not merely designations of the terms, but the terms are defined based on the meaning of the terms and content throughout the present disclosure.

Throughout the present disclosure, when a part "includes" an element, it is to be understood that the part may additionally include other elements rather than excluding other elements as long as there is no particular opposing recitation. In addition, as used herein, the terms such as ". . . er (or)", ". . . unit", ". . . module", etc., denote a unit that performs at least one function or operation, which may be implemented as hardware (e.g., circuitry) or software or a combination thereof.

Hereinafter, example embodiments of the present disclosure will be described in detail with reference to the accompanying drawings to allow those of skill in the art to easily carry out the embodiments. An example embodiment of the present disclosure may, however, be embodied in many different forms and should not be construed as being limited to the embodiment of the present disclosure set forth herein. In addition, parts in the drawings unrelated to the detailed description are omitted to ensure clarity of example embodiments of the present disclosure, and like reference numerals in the drawings denote like elements.

FIG. 1 is a diagram illustrating an example system according to various embodiments of the present disclosure. In an example embodiment, the system may be a virtual reality (VR) system for displaying a virtual reality image to provide a user with a virtual reality experience.

Referring to FIG. 1, the system may include an image display device 110, a server 120, an electronic device 130, and at least one external device 140.

The image display device 110 may display a virtual reality image. For example, the image display device 110 may be a television (TV) capable of displaying a virtual reality image. However, the image display device 110 is not limited thereto and may include various types of image output devices capable of displaying a virtual reality image, such as a monitor, a laptop computer, a tablet, an electronic book terminal, a digital broadcasting terminal, or the like. The image display device 110 may receive, from the server 120, data associated with at least one of the configuration or form of a virtual reality image. The image display device 110 may display the virtual reality image based on the data received from the server 120.

The server 120 may generate data associated with the configuration and form of a virtual reality image. The server 120 may have information associated with the at least one external device 140. The server 120 may generate data representing a virtual reality image associated with the at least one external device 140, by reflecting the information associated with the at least one external device 140.

The image display device 110 may display the virtual reality image associated with the at least one external device 140. The image display device 110 may display a virtual reality image that reflects a virtual scenario associated with the at least one external device 140. For example, the image display device 110 may display a virtual reality image associated with at least one of the shape of the at least one external device 140, the structure of the at least one external device 140, the usage of the at least one external device 140, or the maintenance of the at least one external device 140.

The electronic device 130 may be a portable terminal such as a smart phone, a personal digital assistant (PDA), a tablet, or the like. The electronic device 130 may operate in conjunction with the image display device 110 via the server 120. The electronic device 130 may control at least one of the form or type of a virtual reality image displayed on the image display device 110. The electronic device 130 may retrieve a virtual reality image displayed on the image display device 110. The electronic device 130 may display, on a display of the electronic device 130, a virtual reality image displayed on the image display device 110.

The at least one external device 140 may include, for example, various types of home appliances placed in an indoor space. For example, the at least one external device 140 may include at least one of an air conditioner 141, a microwave oven 142, a washing machine 143, or a robotic cleaner 144. However, the at least one external device 140 is not limited thereto and may include various types of home appliances and electronic devices. For example, the at least one external device 140 may include at least one of an air purifier, a projector, a sound bar, a speaker, a power station, a cordless vacuum cleaner, or the like.

Sensing data associated with the at least one external device 140 may be transmitted to the server 120. The server 120 may determine at least one of the configuration or form of a virtual reality image associated with the at least one external device 140, based on the information associated with the at least one external device 140 and the sensing data associated with the at least one external device 140. The virtual reality image associated with the at least one external device 140 may be displayed on the image display device 110, as determined by the server 120.

Hereinafter, a process of transmitting the sensing data associated with the at least one external device within the system to the server will be described in detail with reference to FIG. 2.

Figure 2:
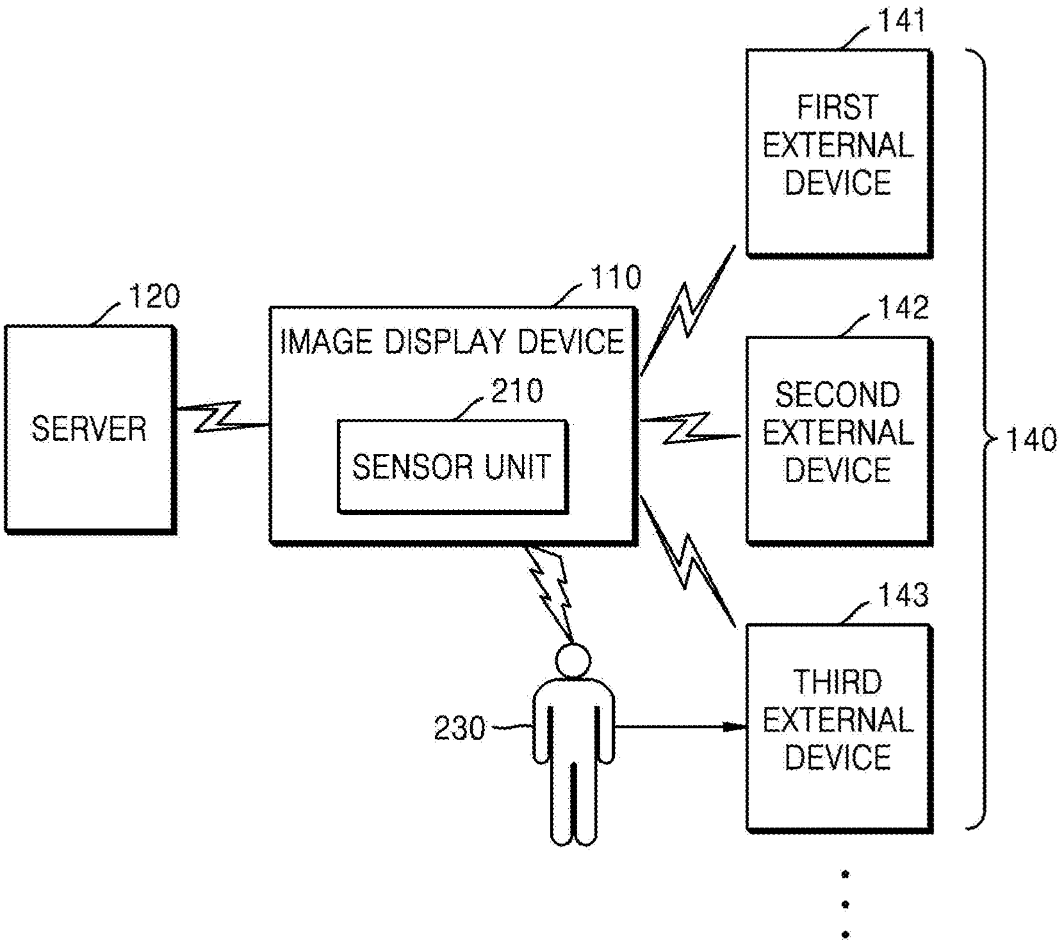
FIG. 2 is a diagram illustrating an example system according to various embodiments of the present disclosure.

FIG. 2 is a diagram illustrating an example system according to various embodiments of the present disclosure. The system according to an embodiment may include the server 120, at least one external device 140, and the image display device 110. The at least one external device 140 may include a first external device 141, a second external device 142, and a third external device 143.

The image display device 110 may include a sensor unit 210.

The sensor unit 210 may include a sensor configured to detect a position, a sensor configured to detect a distance, and/or a sensor configured to detect a gesture. For example, the sensor unit 210 may include an ultra-wideband (UWB) sensor configured to detect a position of a tag device. For example, the sensor unit 210 may include a time-of-flight (ToF) sensor configured to detect a distance. For example, the sensor unit 210 may include a three-dimensional (3D) sensor configured to detect a gesture.

The sensor unit 210 may detect a position of the at least one external device 140. The sensor unit 210 may detect a position of each of the first external device 141, the second external device 142, and the third external device 143. The sensor unit 210 may determine a position of the at least one external device 140 as a first position in an indoor coordinate system. The indoor coordinate system may be a system that defines an indoor space where the at least one external device 140 is placed, on preset coordinate axes. The sensor unit 210 may obtain position information about respective positions of the first external device 141, the second external device 142, and the third external device 143.

The sensor unit 210 may detect a position of a user 230. The sensor unit 210 may determine the position of the user 230 as a second position in the indoor coordinate system. The sensor unit 210 may obtain position information about the position of the user 230.

The sensor unit 210 may detect a distance between the at least one external device 140 and the user 230. The sensor unit 210 may obtain distance information about the distance between the at least one external device 140 and the user 230.

The sensor unit 210 may recognize a gesture of the user 230 with respect to the at least one external device 140. The sensor unit 210 may detect an action of the user 230 with respect to the at least one external device 140. The sensor unit 210 may recognize, as a gesture of the user 230 with respect to the at least one external device 140, an action of the user 230 that may be classified as having an intention associated with the at least one external device 140, from among actions of the user 230. The gesture of the user 230 with respect to the at least one external device 140 that is recognized by the sensor unit 210 may include at least one of a motion of the user approaching the at least one external device 140, a motion of the user's hand with respect to the at least one external device 140, or a motion of the user extending his/her hand to a particular part of the at least one external device 140. For example, when the user 230 extends his/her hand to the rear surface of the third external device 143, the sensor unit 210 may recognize the gesture of the user 230 extending his/her hand to the rear surface of the third external device 143.

The sensor unit 210 may receive sensing data associated with a position of the at least one external device 140, a position of the user 230, and/or a gesture of the user 230 with respect to the at least one external device 140. The sensing data may be data obtained by combining pieces of data associated with a position of the at least one external device 140, a position of the user 230, and/or a gesture of the user 230 with respect to the at least one external device 140. The sensing data may be data representing an interaction between the at least one external device 140 and the user 230. For example, the sensing data may be data indicating that the user 230 is using or performing maintenance of the at least one external device 140. The sensor unit 210 may receive sensing data from sensing devices provided for the at least one external device 140 and the user 230, respectively. For example, the sensing devices may be tag devices attached to the at least one external device 140 and the user 230, respectively. Hereinafter, a tag device may be referred to, for example, as a "tag".

The image display device 110 may transmit the sensing data received by the sensor unit 210 from the sensing devices, to the server 120 through a communication network that wirelessly connects the image display device 110 to the server 120. The server 120 may express a virtual reality image associated with the at least one external device 140, based on the sensing data received from the image display device 110. The server 120 may generate, based on the sensing data, data representing a virtual reality image that reflects an interaction of the user 230 with the at least one external device 140. The server 120 may transmit, to the image display device 110, the data representing the virtual reality image that reflects the interaction of the user 230. Accordingly, the image display device 110 may display the virtual reality image that reflects the interaction of the user 230 with the at least one external device 140. For example, the image display device 110 may display a virtual reality image in which the user is using or performing maintenance of the at least one external device 140.

Hereinafter, components of an image display device will be described with reference to FIG. 3.

Figure 3:
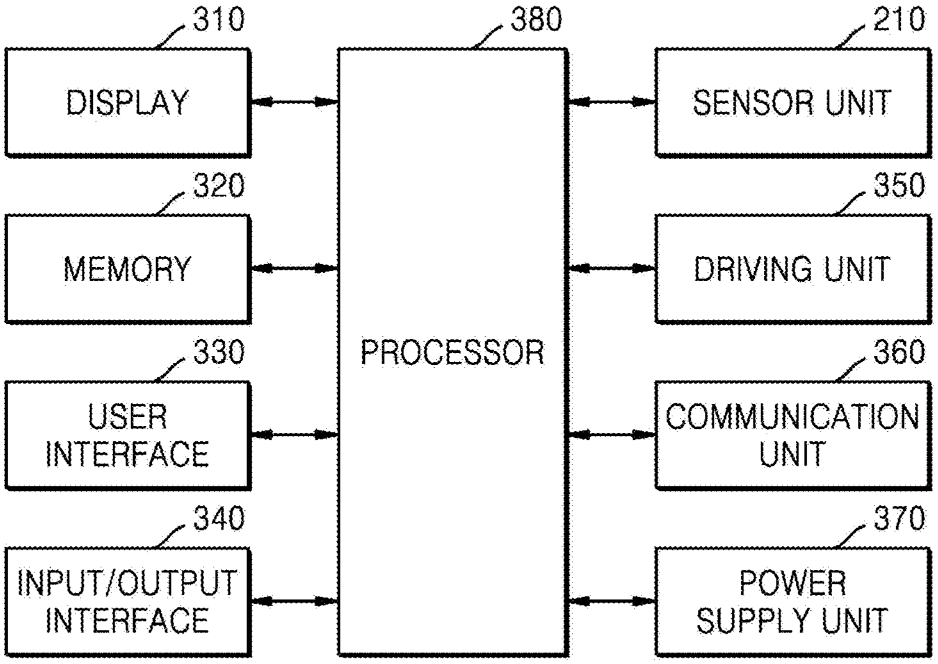
FIG. 3 is a block diagram illustrating an example image display device according to various embodiments of the present disclosure.

FIG. 3 is a block diagram illustrating an example image display device according to various embodiments of the present disclosure. The image display device may include a display 310, a memory 320, a user interface 330, an input/output interface 340, the sensor unit 210, a driving unit 350, a communication unit 360, a power supply unit 370, and a least one processor 380.

The display 310 may display, for example, a virtual reality image. The display 310 may display a virtual reality image corresponding to image data transmitted from the processor 380.

The memory 320 may be a storage unit that stores an operating system (OS). The OS may include a program for expressing a virtual reality image. For example, the memory 320 may be a storage unit included in the image display device.

The memory 320 may store sensing data. The sensing data may include, for example, data associated with a first position of at least one external device, a second position of a user, and a gesture of the user with respect to the at least one external device, which are obtained from the sensor unit 210. The memory 320 may supply the stored sensing data to the processor 380. Accordingly, the processor 380 may generate image data representing a virtual reality image based on the sensing data.

The memory 320 may store device information associated with the at least one external device. The device information may include, for example, an identifier of the at least one external device. The device information may include, in correspondence with each identifier of the at least one external device, information associated with a type of the at least one external device, a model of the at least one external device, an internal disassembly structure of the at least one external device, a function of the at least one external device, a method of using the at least one external device, and maintenance of the at least one external device. The memory 320 may receive an identifier of an external device from the processor 380. The memory 320 may supply, to the processor 380, device information associated with an external device corresponding to the identifier. Accordingly, the processor 380 may generate image data representing a virtual reality image based on the device information associated with the external device corresponding to the identifier.

The user interface 330 (including, e.g., user interface circuitry) may include an input unit (including, e.g., input circuitry) configured to receive a user input, and an output unit (including, e.g., output circuitry) configured to provide feedback to the user. The input unit may include, for example, at least one of a physical key included in the image display device, a physical key included in a separate remote control device that is remotely connected to the image display device, such as a remote controller, a microphone configured to receive a voice input from the user, or a graphical user interface (GUI) configured to allow the user to make a touch input to a virtual reality image displayed on the display 310. The output unit may include, for example, at least one of a speaker configured to provide the user with a sound corresponding to a virtual reality image, or a haptic feedback output device configured to provide the user with a tactile effect corresponding to a virtual reality image.

The input/output interface 340 may allow the processor 380 to transmit and receive data and signals exchanged between the at least one external device. The input/output interface 340 may include a transceiver circuit configured to transmit and receive radio-frequency (RF) signals. The input/output interface 340 may input and output RF signals between the at least one external device, sensor signals between the at least one external device, audio signals between the at least one external device, and image signals between the at least one external device.

The sensor unit 210 (including, e.g., a sensor) may determine a position of the at least one external device, and a position of the user. The sensor unit 210 may include an UWB sensor for detecting positions of the at least one external device and the user. The sensor unit 210 may include an image sensor for detecting surrounding environments, surrounding objects, and projection surfaces. For example, the sensor unit 210 may include a camera.

The sensor unit 210 may determine a distance between the at least one external device and the user. The sensor unit 210 may recognize a gesture of the user with respect to the at least one external device. The sensor unit 210 may include a distance sensor for detecting a distance between the at least one external device and the user. The sensor unit 210 may include a gesture recognition sensor for recognizing a gesture of the user with respect to the at least one external device. For example, the sensor unit 210 may include a ToF sensor. The sensor unit 210 may include an orientation sensor for detecting an orientation of the at least one external device and an orientation of the user. For example, the sensor unit 210 may include at least one of an acceleration sensor or a gyro sensor.

The driving unit 350 (including, e.g., driving circuitry) may drive at least one sensor included in the sensor unit 210. The driving unit 350 may individually or integrally drive the sensors included in the sensor unit 210, under control of the processor 380.

The communication unit 360 (including, e.g., communication circuitry) may allow the at least one external device and the processor 380 to perform communication. The communication unit 360 may connect the processor 380 to an Internet server. The communication unit 360 may support short-range wireless communication such as Bluetooth (BT) communication or near-field communication (NFC) communication. The communication unit 360 may support long-range wireless communication such as Wi-Fi communication or cellular communication.

The communication unit 360 may be connected to a server to perform communication. The server may include a plurality of virtual scenarios associated with the at least one external device. The plurality of virtual scenarios may include at least one of a scenario associated with use of the at least one external device, a scenario associated with an internal disassembly structure of the at least one external device, a scenario associated with a function of the at least one external device, or a scenario associated with maintenance of the at least one external device. The communication unit 360 may integrate pieces of sensing data obtained from the sensor unit 210. The server may have an algorithm for processing sensing data. The communication unit 360 may transmit sensing data to the server.

The power supply unit 370 (including, e.g., power supply circuitry) may supply power to the display 310, the memory 320, the user interface 330, the input/output interface 340, the sensor unit 210, the driving unit 350, the communication unit 360, and/or the processor 380. For example, the power supply unit 370 may be a battery included in the image display device. For example, the power supply unit 370 may be a plug circuit arranged on the rear surface of the image display device and connected to an external power source.

The at least one processor 380 (including, e.g., processing circuitry) may be electrically connected to the display 310, the memory 320, the user interface 330, the input/output interface 340, the sensor unit 210, the driving unit 350, the communication unit 360, the power supply unit 370, and/or a server communication unit 220. The processor 380 may control the overall operation of the display 310, the memory 320, the user interface 330, the input/output interface 340, the sensor unit 210, the driving unit 350, the communication unit 360, the power supply unit 370, and/or the server communication unit 220. The processor 380 may be, for example, a control circuit configured to perform computation and processing functions to control the overall operation of the display 310, the memory 320, the user interface 330, the input/output interface 340, the sensor unit 210, the driving unit 350, the communication unit 360, the power supply unit 370, and/or the server communication unit 220. For example, the processor 380 may be an application processor (AP) included in an electronic device constituting the image display device 110.

The processor 380 may control the communication unit 360 to transmit sensing data to the server 120. The sensing data transmitted to the server 120 may be used to select a virtual scenario that matches an intention of the user with respect to the at least one external device. The server 120 may execute an algorithm for processing sensing data. The algorithm for processing sensing data executed by the server 120 may determine, based on the sensing data, an intention of the user with respect to the at least one external device. The intention of the user may include at least one of using at least one external device, observing an interior of the at least one external device, learning a function of the at least one external device, and/or maintenance of the at least one external device.

The server 120 may set a virtual scenario that matches the intention of the user using the algorithm for processing sensing data. The virtual scenario that matches the intention of the user may be a virtual scenario that satisfies the intention of the user associated with the at least one external device. For example, when the intention of the user is to use the at least one external device, the virtual scenario that matches the intention of the user may be a virtual scenario for guiding the user through a method of using the at least one external device. For example, when the intention of the user is to observe an interior of the at least one external device, the virtual scenario that matches the intention of the user may be a virtual scenario for showing an internal structure or exploded view of the at least one external device. For example, when the intention of the user is to learn a function of the at least one external device, the virtual scenario that matches the intention of the user may be a virtual scenario for guiding the user through functions of the at least one external device. For example, when the intention of the user is to perform maintenance of the at least one external device, the virtual scenario that matches the intention of the user may be a virtual scenario for guiding the user through a method of performing maintenance of the at least one external device. The server 120 may store a plurality of virtual scenarios in a database. The server 120 may select a first virtual scenario that matches the intention of the user with respect to the at least one external device, from among the plurality of virtual scenarios stored therein.

The processor 380 may control the communication unit 360 to receive the first virtual scenario selected by the server. The processor 380 may generate a virtual reality image that reflects the first virtual scenario. The processor 380 may display, on the display 310, a virtual reality image corresponding to the first virtual scenario. The virtual reality image corresponding to the first virtual scenario may include at least one of a virtual reality image for guiding the user through a method of using the at least one external device, a virtual reality image for showing an internal structure of the at least one external device when disassembled, a virtual reality image for guiding the user through a function of the at least one external device, and a virtual reality image for guiding the user through maintenance of the at least one external device.

Hereinafter, the main operations included in an example method, performed by an image display device, of displaying a virtual reality image, according to various embodiments of the present disclosure, will be described with reference to FIG. 4.

Figure 4:
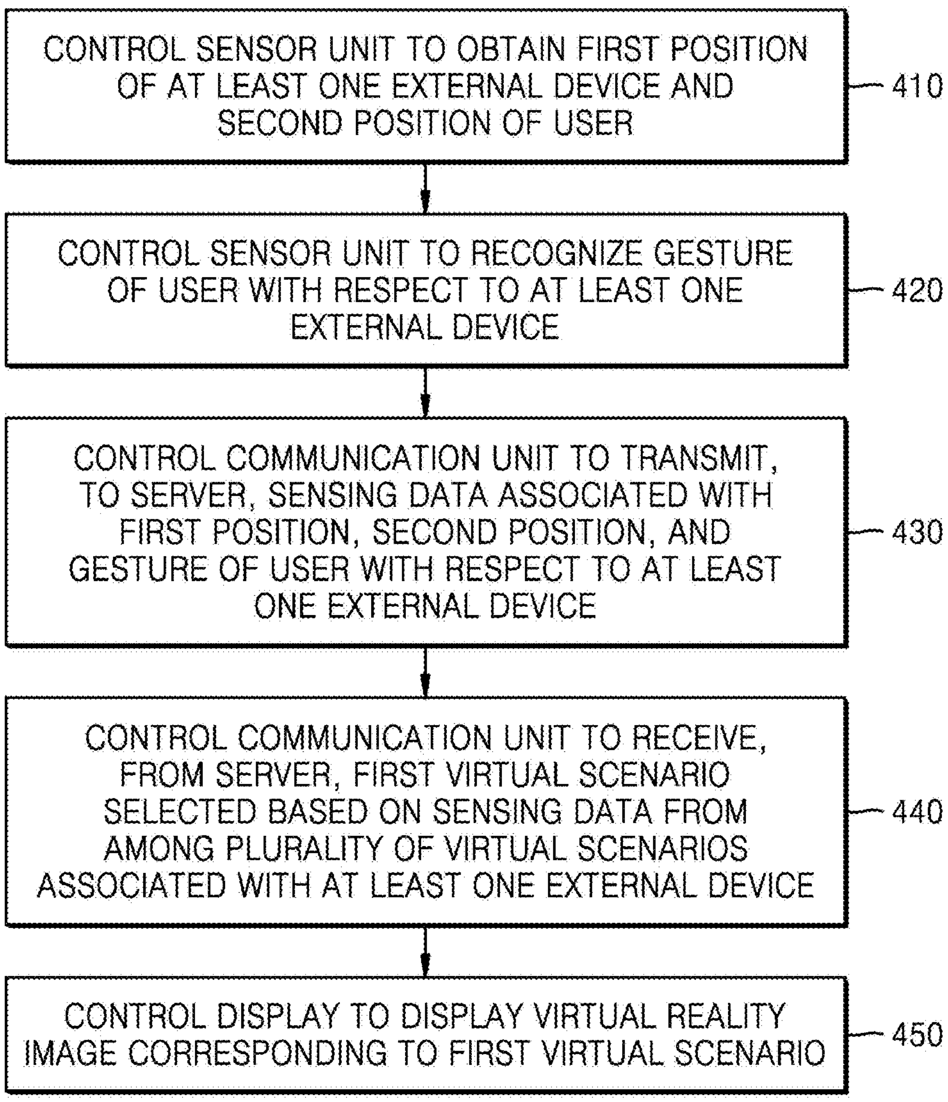
FIG. 4 is a flowchart illustrating operations of an example image display device, according to various embodiments of the present disclosure.

FIG. 4 is a flowchart illustrating example operations of an image display device, according to various embodiments of the present disclosure.

According to an embodiment, in operation 410, at least one processor of the image display device may control a sensor unit to obtain a first position of at least one external device, and a second position of a user. The processor may control the sensor unit to detect a position of the at least one external device. The processor may control the sensor unit to detect a position of the user. The processor may determine, as the first position, the position of the at least one external device, based on a result of detection by the sensor unit. The processor may determine, as the second position, the position of the user, based on a result of detection by the sensor unit. For example, the at least one external device may have a first tag device attached thereto. In a case in which a first tag device is attached to the at least one external device, the processor may control the sensor unit to detect a position of the first tag device to determine the first position. For example, the user may carry a second tag device. In a case in which the user is carrying the second tag device, the processor may control the sensor unit to detect a position of the second tag device to determine the second position.

In an embodiment, the processor may register a user device in a memory. The user device may be at least one external device. In an example embodiment, registering, by the processor, the user device in the memory may be performed before operation 410. The user device may be at least one of a device that the user intends to use, a device that the user intends to check the internal structure of, a device that the user intends to execute a function of, and a device that the user intends to perform maintenance of. When the processor registers the user device in the memory, the processor may control the sensor unit such that the registered device is included in a list of devices to be detected and determined.

According to an embodiment, in operation 420, the at least one processor may control the sensor unit to recognize a gesture of the user with respect to the at least one external device. The processor may control the sensor unit to detect an interaction between the at least one external device and the user. The processor may control the sensor unit to detect a distance between the user and the at least one external device. The processor may control the sensor unit to detect an action attempted by the user on the at least one external device. The processor may control the sensor unit to detect the form of a gesture attempted by the user on the at least one external device. For example, the processor may control the sensor unit to detect an action of the user moving toward the at least one external device, an action of the user attempting to manipulate a button input unit of the at least one external device, and/or an action of the user extending his/her hand to the lower surface or rear surface of the at least one external device.

According to an embodiment, in operation 430, the at least one processor may control a communication unit to transmit, to a server, sensing data associated with the first position, the second position, and the gesture of the user with respect to the at least one external device. The sensing data may include a position of the at least one external device, a position of the user, and an interaction between the at least one external device and the user. The server that has received the sensing data may execute an algorithm. The algorithm may be, for example, an integrated sensing algorithm for determining an intention of the user with respect to the at least one external device, based on a gesture of the user. The algorithm may be based on artificial intelligence (AI). The server may analyze the sensing data by using the algorithm.

According to an embodiment, in operation 440, the at least one processor may control the communication unit to receive, from the server, a first virtual scenario selected based on the sensing data from among a plurality of virtual scenarios associated with the at least one external device. The server may analyze the sensing data to determine the intention of the user with respect to the at least one external device. The intention of the user may include at least one of use, an internal structure, a function, or maintenance of the at least one external device. The server may select the first virtual scenario that corresponds to the determined intention of the user, from among a plurality of virtual scenarios stored in a database (DB). The server may select the first virtual scenario that satisfies the intention of the user associated with the at least one external device. The processor may control the communication unit to receive, from the server, the first virtual scenario selected by the server.

According to an embodiment, in operation 450, the at least one processor may control a display to display a virtual reality image that reflects the first virtual scenario. The processor may generate a virtual reality image that reflects the received first virtual scenario. The processor may control the display to display the virtual reality image.

In the embodiment illustrated in FIG. 4, an example is described in which the image display device 110 transmits the sensing data to the server, and the server selects a virtual scenario corresponding to the sensing data. However, the disclosed embodiment is not limited thereto. In an example embodiment, in a case in which resources of the image display device 110 are available, the image display device 110 may include the integrated sensing algorithm. That is, the image display device 110 may select a first virtual scenario corresponding to the intention of the user by determining the intention of the user with respect to the at least one external device based on the sensing data associated with the first position, the second position, and the gesture of the user with respect to the at least one external device.

When the image display device displays the virtual reality image in operation 450, the user may manipulate the image display device using a remote control device such as a remote controller. For example, the user may use the remote control device to turn the image display device on or off. For example, the user may use the remote control device to adjust the aspect ratio of a virtual reality image displayed on the image display device, the magnification of the virtual reality image, the brightness of the virtual reality image, the color tone of the virtual reality image, and/or the volume when displaying the virtual reality image. For example, the user may use the remote control device to share a virtual reality image displayed on the image display device, with a portable electronic device such as a portable terminal. To allow the user to manipulate the image display device using the remote control device, the image display device and the remote control device may establish an interconnection by transmitting and receiving connection packets. Hereinafter, a configuration of an example connection packet for connecting an image display device to a remote control device such as a remote controller, according to various embodiments of the present disclosure, will be described with reference to FIG. 5.

Figure 5:
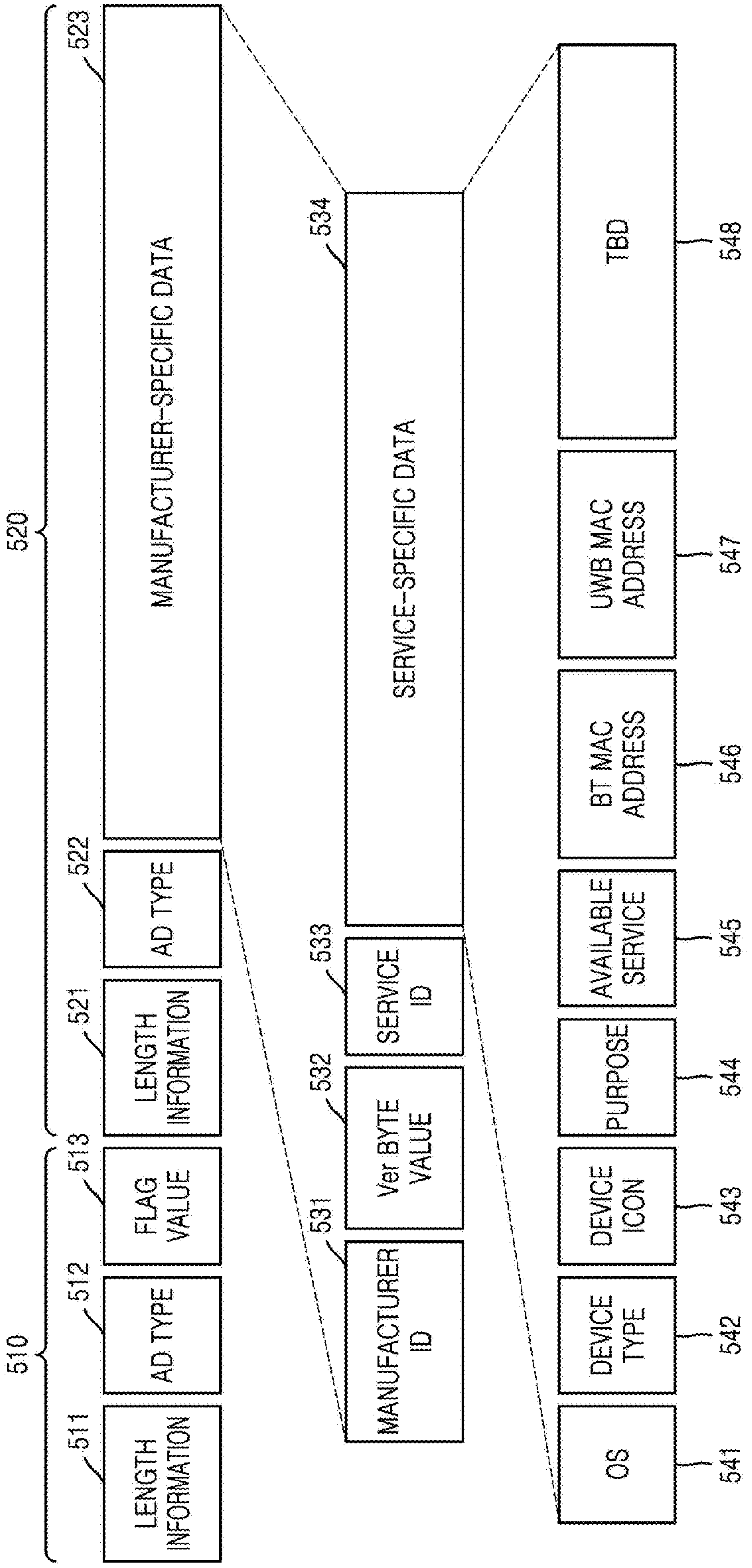
FIG. 5 is a diagram illustrating an example connection packet according to various embodiments of the present disclosure.

FIG. 5 is a diagram illustrating an example connection packet according to various embodiments of the present disclosure. The connection packet may include a plurality of Active Directory (AD) structures 510 and 520. The plurality of AD structures 510 and 520 may have different types. For example, the connection packet may include a first AD structure 510 having a 0x01 type and a second AD structure 520 having a 0xff type. The plurality of AD structures 510 and 520 may include length information 511 and 521, and AD types 512 and 522, respectively. The first AD structure 510 may include a flag value 513. The second AD structure 520 may include manufacturer-specific data 523.

The length information 511 and 521 may include 1 byte and may represent the length of the plurality of AD structures 510 and 520, respectively. For example, the length information 511 of the first AD structure 510 may have a value of 0x02. The AD types 512 and 522 may each include 1 byte, and may represent the types of the plurality of AD structures 510 and 520, respectively. For example, the AD type 512 of the first AD structure 510 may have a value of 0x01, and the AD type 522 of the second AD structure 520 may have a value of 0xFF. The flag value 513 may include 1 byte to represent a flag value assigned to the packet. The manufacturer-specific data 523 may be data representing unique characteristics of the manufacturer, and may have a size of up to 26 bytes. The manufacturer-specific data 523 may include a manufacturer identifier (ID) 531, a Ver byte value 532, a service ID 533, and service-specific data 534.

The manufacturer ID 531 may be a value determined for each manufacturer of an electronic device including an image display unit, and may have a size, for example, of 2 bytes. For example, in a case in which the image display unit is a TV, the manufacturer ID 531 may have a value such as 0x75 0x00. The Ver byte value 532 may be a value determined according to the model version of the electronic device including the image display unit, and may have a size, for example, of 1 byte. For example, in a case in which the image display unit is a TV, the Ver byte value 532 may have a value of 0x02 or 0x42. The service ID 533 may be a value determined according to the type of a service provided by the image display unit, and may have a size, for example, of 1 byte. For example, in a case in which the image display unit provides a virtual reality image, the service ID 533 may have a value of 0x0D. The service-specific data 534 may be data that determines the detailed type of the service, and may have a size of up to 22 bytes. The service-specific data 534 may include an OS 541, a device type 542, a device icon 543, a purpose 544, an available service 545, a BT medium access control (MAC) address 546, a UWB MAC address 547, and TBD 548.

The OS 541 may have a size, for example, of 1 byte and may have a value defining an OS to be used and the manufacturer. For example, in a case in which the OS 541 represents a mobile OS, the OS 541 having a value of 0x00 may define an unknown OS, the OS 541 having a value of 0x01 may define an Android OS from a first company, and the OS 541 having a value of 0x02 may define an Android OS from a second company. The device type 542 may, for example, be a 1-byte value that determines a standard device type. The device icon 543 may, for example, be a 1-byte value that determines a standard device icon.

The purpose 544 may have, for example, a size of 1 byte and may define a sensor to be activated by a signal, or a viewpoint of a virtual reality image to be displayed. For example, the 0th bit of the purpose 544 may define an ambient sensor, the 1st bit may define a remote smart view, the 2nd bit may define a tap view, and the 3rd bit may define UWB. The available service 545 may have, for example, a size of 1 byte and may define a function that the packet is to perform. For example, when a remote controller transmits a packet toward a TV, the 0th bit of the available service 545 may define screen mirroring, the 1st bit may define TV mute, the 2nd bit may define mobile keyboard, the 3rd bit may define secure sign in, and the 4th bit may define payment push.

The BT MAC address 546 may have, for example, a size of 6 bytes and may represent MAC address information about the TV during Bluetooth communication. The UWB MAC address 547 may have, for example, a size of 6 bytes and may represent MAC address information about the TV during ultra-wideband communication. The TBD 548 may be a remaining space at the end of the packet.

When obtaining the first position of the at least one external device and the second position of the user in operation 410, a connection between the remote control device and the image display device, and a connection between the remote control device and the at least one external device can be established to obtain the first position of the at least one external device and the second position of the user. For example, in a case in which a UWB tag is attached to the at least one external device, the remote control device can be UWB-paired with the image display device and the at least one external device, to obtain the first position of the at least one external device and the second position of the user by using a UWB anchor. In addition, to perform UWB pairing, the remote control device can have Bluetooth Low Energy (BLE) connections established with the image display device and the at least one external device. To establish the BLE connections, perform UWB pairing, and obtain the first position of the at least one external device and the second position of the user, the remote control device, the image display device, and the tag may transmit and receive packets. Hereinafter, an example flow of packets between a TV, a remote controller, and a tag will be described with reference to FIG. 6.

Figure 6:
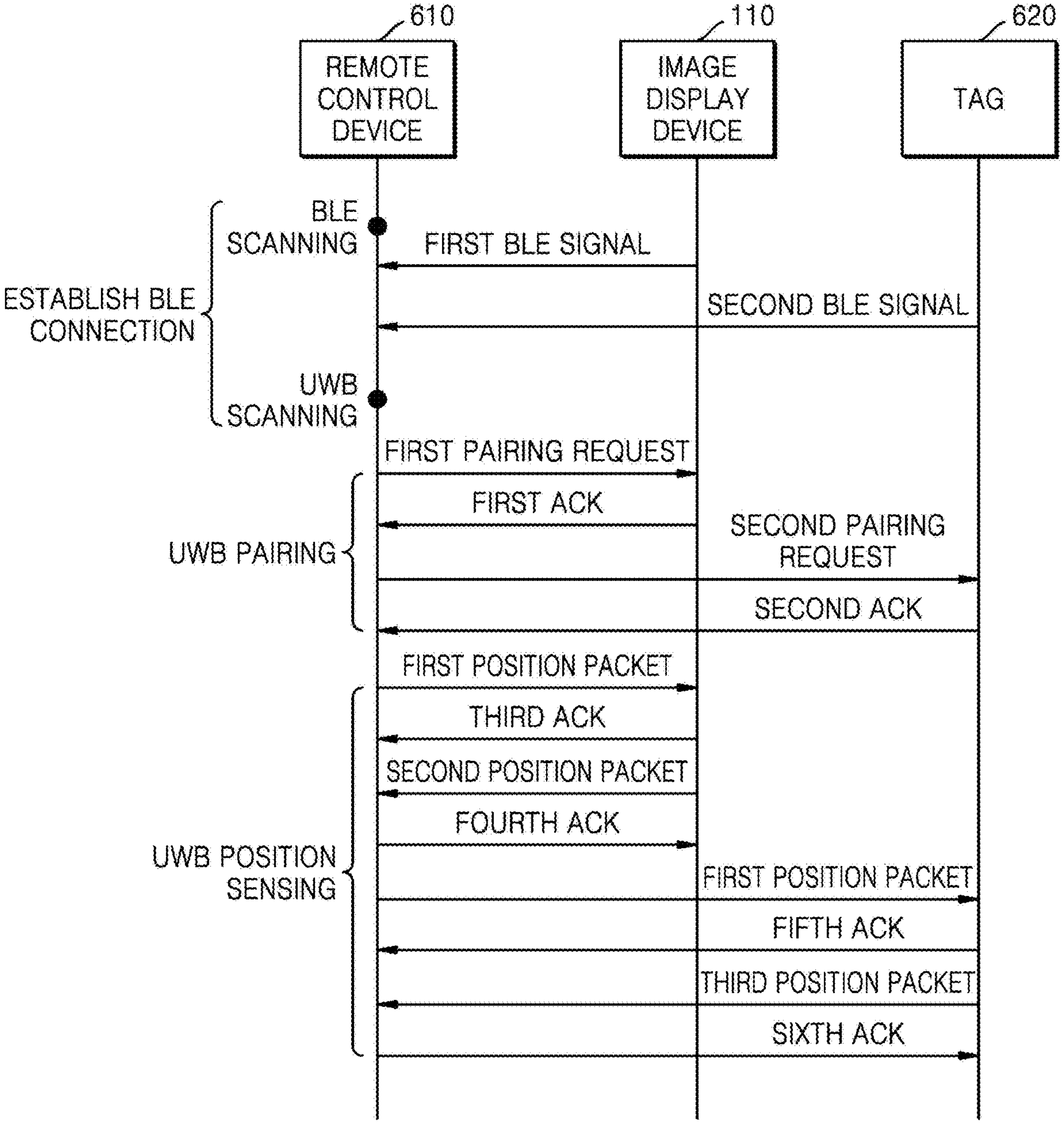
FIG. 6 is a flowchart illustrating transmission of packets between an example image display device, an example remote control device, and an example tag, according to various embodiments of the present disclosure.

FIG. 6 is a flowchart illustrating an example transmission of packets between the image display device 110, a remote control device 610, and a tag 620, according to various embodiments of the present disclosure. FIG. 6 illustrates, in a case in which the image display device 110 is a TV and the remote control device 610 is a remote controller, a connection sequence for establishing connections between the TV, the remote controller, and the tag 620, and transmitting packets. The tag may be, for example, a signal transmitting and receiving device attached to at least one external device. The tag may transmit and receive UWB signals.

In an example embodiment, the image display device 110, the remote control device 610, and the tag 620 may establish a BLE connection. The BLE connection may be referred to, for example, as BLE ranging. The remote control device 610 may perform BLE scanning to find a nearby device transmitting a BLE signal. The image display device 110 may transmit a first BLE signal to the remote control device 610. The tag 620 may transmit a second BLE signal to the remote control device 610. The first BLE signal and the second BLE signal may be, for example, BLE Advanced (Adv.) signals. The BLE Advanced signal may include passive entry and a UWB session ID. The remote control device 610 may establish a BLE connection with the image display device 110 based on the first BLE signal. The remote control device 610 may establish a BLE connection with the tag 620 based on the second BLE signal. Mutual communication may be performed between the image display device 110 and the remote control device 610 using the BLE Advanced signals.

In an example embodiment, the image display device 110, the remote control device 610, and the tag 620 may establish UWB pairing. UWB pairing may be performed after establishing BLE connections between the image display device 110, the remote control device 610, and the tag 620. The remote control device 610 may transmit a first pairing request to the image display device 110. The first pairing request may include a UWB session ID. The image display device 110 may transmit a first acknowledgment (ACK) to the remote control device 610 in response to the first pairing request, and be UWB-paired with the remote control device 610. The remote control device 610 may transmit a second pairing request to the tag 620. The second pairing request may include a UWB session ID. The tag 620 may transmit a second ACK to the remote control device 610 in response to the second pairing request, and be UWB-paired with the remote control device 610. When the UWB pairing is completed, communication may be initialized. At least one image display device 110 and at least one tag 620 may be connected to the remote control device 610 by UWB pairing.

In an example embodiment, the image display device 110, the remote control device 610, and the tag 620 may perform UWB position sensing. UWB position sensing may include a locality check. The remote control device 610 may transmit a first position packet to the image display device 110. The first position packet may include position information about the remote control device 610. The image display device 110 may transmit a third ACK to the remote control device 610 in response to receiving the first position packet. The image display device 110 may transmit a second position packet to the remote control device 610. The second position packet may include position information about the image display device 110. The remote control device 610 may transmit a fourth ACK to the image display device 110 in response to receiving the second position packet. The remote control device 610 may calculate a distance between the remote control device 610 and the image display device 110 using the second position packet. The remote control device 610 may transmit the first position packet to the tag 620. The tag 620 may transmit a fifth ACK to the remote control device 610 in response to receiving the first position packet. The tag 620 may transmit a third position packet to the remote control device 610. The third position packet may include position information about the tag 620. The remote control device 610 may transmit a sixth ACK to the tag 620 in response to receiving the third position packet. The remote control device 610 may calculate a distance between the remote control device 610 and the tag 620 using the third position packet.

When obtaining the first position of the at least one external device and the second position of the user in operation 410, the sensor unit of the image display device may receive a UWB signal transmitted from the UWB anchor. The sensor unit of the image display device may determine the first position of the external device and the second position of the user by using the received UWB signal. Hereinafter, a configuration of an example UWB anchor will be described with reference to FIG. 7.

Figure 7:
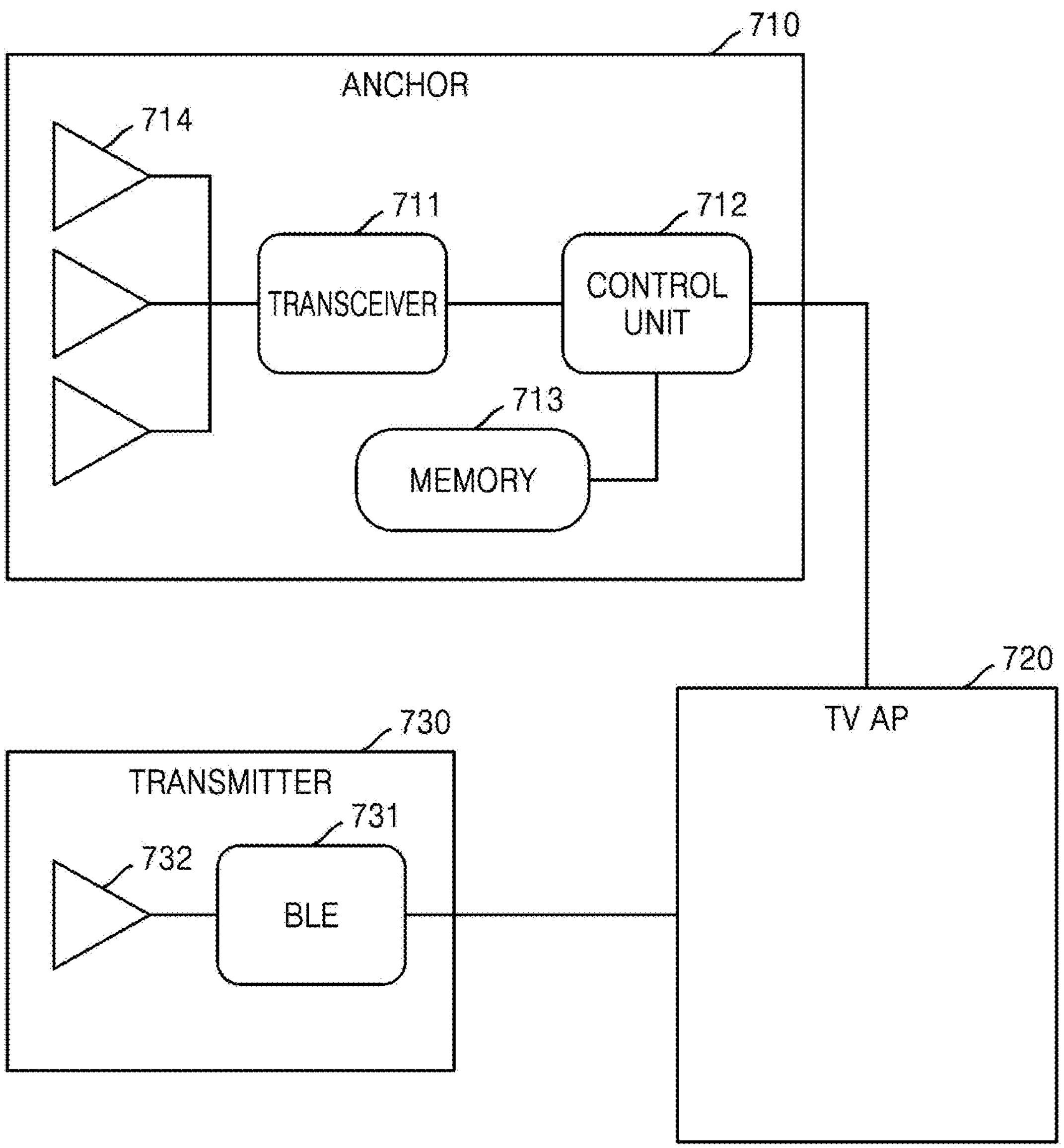
FIG. 7 is a block diagram illustrating an example anchor according to various embodiments of the present disclosure.

FIG. 7 is a block diagram illustrating an example anchor 710 according to various embodiments of the present disclosure.

The anchor 710 may transmit and receive UWB signals. The anchor 710 may receive a UWB signal transmitted from a tag. The anchor 710 may be connected to a TV access point (AP) 720. The anchor 710 may transmit a UWB signal to the TV AP 720. The anchor 710 may include a transceiver 711, a control unit 712, a memory 713, and an amplifier 714.

The transceiver 711 may transmit and receive UWB signals. The transceiver 711 may receive a UWB signal transmitted from the amplifier 714. The transceiver 711 may be connected to the control unit 712 (including, e.g., control circuitry) in a Serial Peripheral Interface (SPI) manner. The transceiver 711 may transmit a UWB signal to the control unit 712.

The control unit 712 may receive a UWB signal from the transceiver 711. The control unit 712 may store the received UWB signal in the memory 713. The control unit 712 may be implemented, for example, as a microcontroller unit (MCU). The control unit 712 may process a UWB signal to determine a position of a tag that has transmitted the UWB signal. The control unit 712 may be connected to the TV AP 720 in an Inter-Integrated Circuit (I2C) communication manner or a Universal Serial Bus (USB) manner. The control unit 712 may transmit, to the TV AP 720, position information about the tag that has transmitted the UWB signal.

The memory 713 may store a UWB signal. The memory 713 may transmit a previously stored UWB signal to the control unit 712. The memory 713 may store position information about a tag that has transmitted a UWB signal input to the control unit 712. The memory 713 may be, for example, flash memory.

The amplifier 714 may amplify a UWB signal received from a tag. The amplifier 714 may transmit the amplified UWB signal to the control unit 712.

The TV AP 720 may receive, from the control unit 712, position information about a tag that has transmitted a UWB signal. The TV AP 720 may calculate a distance between the TV and the tag based on the position information about the tag. The TV AP 720 may be connected to a BLE unit 731 of a transmitter 730.

The transmitter 730 may transmit a signal in a BLE manner. The transmitter 730 may be paired with a tag in a BLE manner. The BLE unit 731 (including, e.g., BLE circuitry) may generate a BLE signal. The BLE unit 731 may amplify a BLE signal using an amplifier 732. The BLE unit 731 may transmit the amplified BLE signal.

When obtaining the first position of the at least one external device and the second position of the user in operation 410, a UWB tag may be attached to the at least one external device or may be carried by the user. The UWB anchor may receive a UWB signal transmitted from the UWB tag. The sensor unit may measure the first position of the external device having a UWB tag attached thereto, and the second position of the user carrying a UWB tag, using UWB signals received by the UWB anchor. Hereinafter, a configuration of an example UWB tag will be described with reference to FIG. 8.

Figure 8:
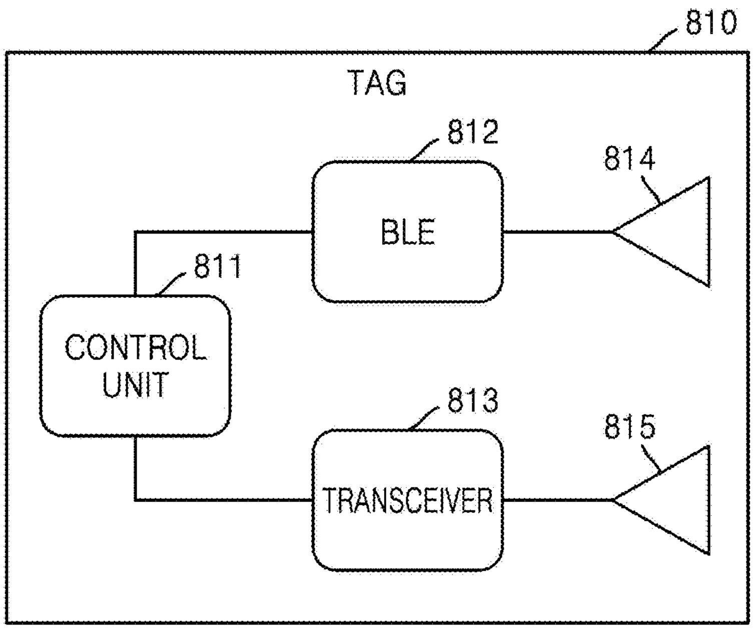
FIG. 8 is a block diagram illustrating an example tag according to various embodiments of the present disclosure.

FIG. 8 is a block diagram illustrating an example tag 810 according to various embodiments of the present disclosure. The tag 810 may transmit a UWB signal. The UWB signal transmitted from the tag 810 may be received by a UWB anchor and used to identify a position of the tag 810. The tag 810 may include a control unit 811 (including, e.g., control circuitry), a BLE unit 812 (including, e.g., BLE circuitry), a transceiver 813, a first amplifier 814, and a second amplifier 815.

The control unit 811 may transmit, to the BLE unit 812, information associated with a BLE signal. The control unit 811 may transmit, to the transceiver 813, information associated with a UWB signal. The information associated with the UWB signal may include position information associated with the position of the tag 810. The control unit 811 may be implemented as an MCU.

The BLE unit 812 may generate a BLE signal. The BLE unit 812 may amplify a BLE signal using the first amplifier 814. The BLE unit 812 may transmit the amplified BLE signal.

The transceiver 813 may generate a UWB signal. The transceiver 813 may amplify a UWB signal using the second amplifier 815. The transceiver 813 may transmit the amplified UWB signal.

When obtaining the first position of the at least one external device and the second position of the user in operation 410, the first position and the second position may be obtained while the at least one external device and the user remain stationary without moving. Hereinafter, an example method of obtaining a positions of at least one external device and a user before the at least one external device and the user move will be described with reference to FIG. 9.

Figure 9:
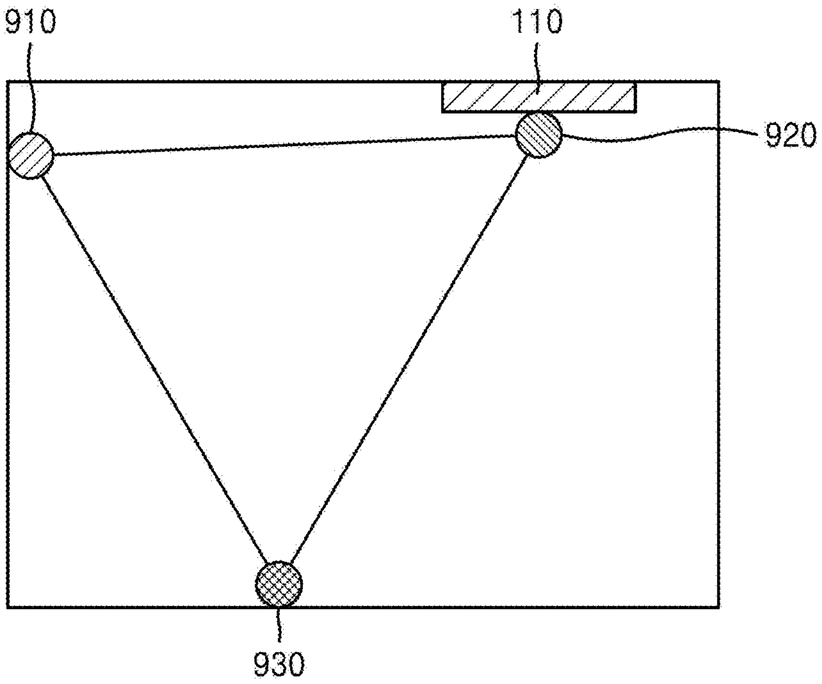
FIG. 9 is a diagram illustrating an example of obtaining a position of an example external device, according to various embodiments of the present disclosure.

FIG. 9 is a diagram illustrating obtaining of a position of an external device, according to various embodiments of the present disclosure. A position of an external device may be obtained through an indoor localization method based on UWB communication.

A first tag 910 may be attached to a wall in an indoor space. A second tag 920 may be installed in the image display device 110. For example, in a case in which the image display device 110 is a TV, the second tag 920 may be attached to the image display device 110 itself. For example, in a case in which the image display device 110 is a TV, an internal module or an external module may be mounted on the image display device 110, and the second tag 920 may be fixed to the internal module or external module. A third tag 930 may be attached to or installed in the external device. For example, in a case in which the external device whose position is to be measured is an air conditioner, the third tag 930 may be attached to the air conditioner. For example, in a case in which the external device whose position is to be measured is a remote control device such as a remote controller, or a mobile terminal, the third tag 930 may be installed in the remote control device or mobile terminal. An anchor configured to perform UWB communication with the first tag 910, the second tag 920, and the third tag 930 may be installed in the indoor space. For example, an anchor configured to perform UWB communication may be attached to a ceiling in the indoor space.

The anchor configured to perform UWB communication may receive a UWB signal from each of the first tag 910, the second tag 920, and the third tag 930. The anchor configured to perform UWB communication may calculate a position of the external device to which the third tag 930 is attached, based on the received UWB signal. The anchor configured to perform UWB communication may calculate a position of the third tag 930 based on, for example, a triangulation method. The anchor configured to perform UWB communication may calculate a relative position of the third tag 930 with respect to the first tag 910 and the second tag 920. For example, the anchor configured to perform UWB communication may calculate a first distance between the first tag 910 and the third tag 930, a second distance between the second tag 920 and the third tag 930, and a first angle formed by the first tag 910 and the second tag 920 as viewed from the third tag 930. The anchor configured to perform UWB communication may calculate a relative position of the third tag 930 with respect to the first tag 910 and the second tag 920, based on the first distance, the second distance, and the first angle.

When obtaining the first position of the at least one external device and the second position of the user in operation 410, the first position and the second position may be obtained while or after at least one of the at least one external device and the user moves. Hereinafter, an example method of obtaining positions of at least one external device and a user while or after at least one of the at least one external device and the user moves will be described with reference to FIG. 10.

Figure 10:
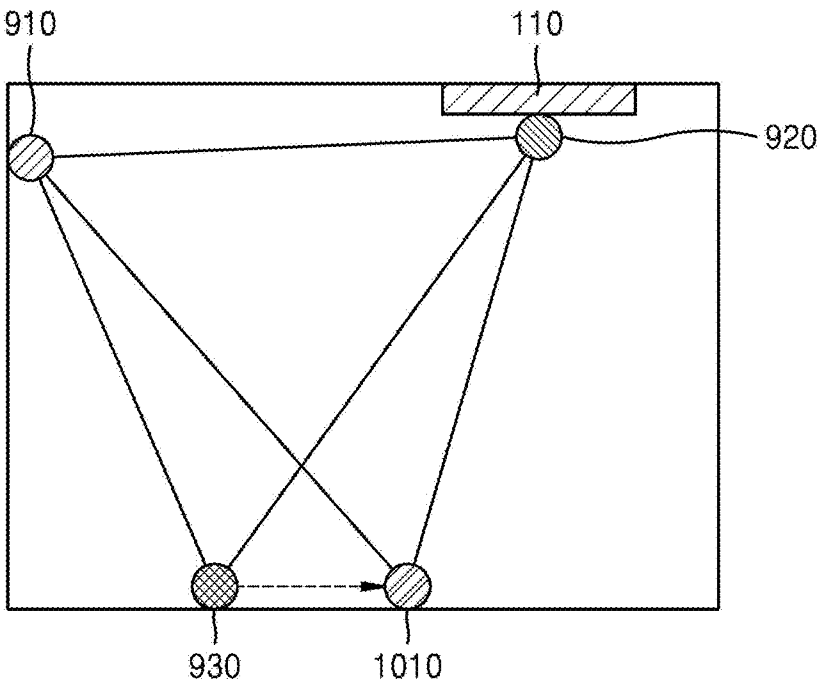
FIG. 10 is a diagram illustrating an example of obtaining a position of an external device after the example external device moves, according to various embodiments of the present disclosure.

FIG. 10 is a diagram illustrating obtaining of a position of an external device after the external device moves, according to various embodiments of the present disclosure.

An external device having the third tag 930 attached thereto may move. The external device having the third tag 930 attached thereto may move to a first position 1010. The anchor configured to perform UWB communication may receive a UWB signal from each of the first tag 910, the second tag 920, and the third tag 930. The anchor configured to perform UWB communication may calculate the first position 1010 to which the external device has moved, based on the received UWB signal. The anchor configured to perform UWB communication may calculate the first position 1010 based on, for example, a triangulation method.

The anchor configured to perform UWB communication may calculate coordinate values of the first position 1010. For example, the anchor configured to perform UWB communication may calculate a third distance between the first tag 910 and the first position 1010, a fourth distance between the second tag 920 and the first position 1010, and a second angle formed by the first tag 910 and the second tag 920 as viewed from the first position 1010. The anchor configured to perform UWB communication may calculate coordinate values of the first position 1010 based on the third distance, the fourth distance, and the twelfth angle.

The sensor unit of the image display device 110 may calculate a degree of displacement with respect to the first position 1010 by comparing the first position 1010 with the original position of the third tag 930. The sensor unit of the image display device 110 may include at least one of an angle-of-attack (AOA) sensor or a 9-axis sensor. The 9-axis sensor may include an acceleration sensor, a geomagnetic sensor, and/or a gyro sensor. The AOA sensor may detect an angle formed by the central axis of the external device and the direction of movement of the external device. The 9-axis sensor may detect an acceleration of the external device, a geomagnetic environment around the external device, and/or an orientation of the external device. The sensor unit of the image display device 110 may detect the amount of change in the position of the external device after the external device moves, compared to before the external device moves. When obtaining the first position of the at least one external device and the second position of the user in operation 410, when at least one of the at least one external device and the user moves, the UWB anchor may need to perform again UWB communication to obtain the first position and the second position after the movement. When the first position and the second position before the movement are known, and only the change in the position of the external device after the movement is detected compared to before the movement, the amount of packets transmitted and received in UWB communication for obtaining the first position and the second position after the movement may be reduced.

When obtaining the first position of the at least one external device in operation 410, a new external device may be added and a position of the new external device may be obtained as the first position. For example, the user may first obtain a position of an air conditioner in the indoor space, and then add a robotic cleaner to obtain a position of the robotic cleaner. Hereinafter, an example method of obtaining a position of a newly registered device will be described with reference to FIG. 11.

Figure 11:
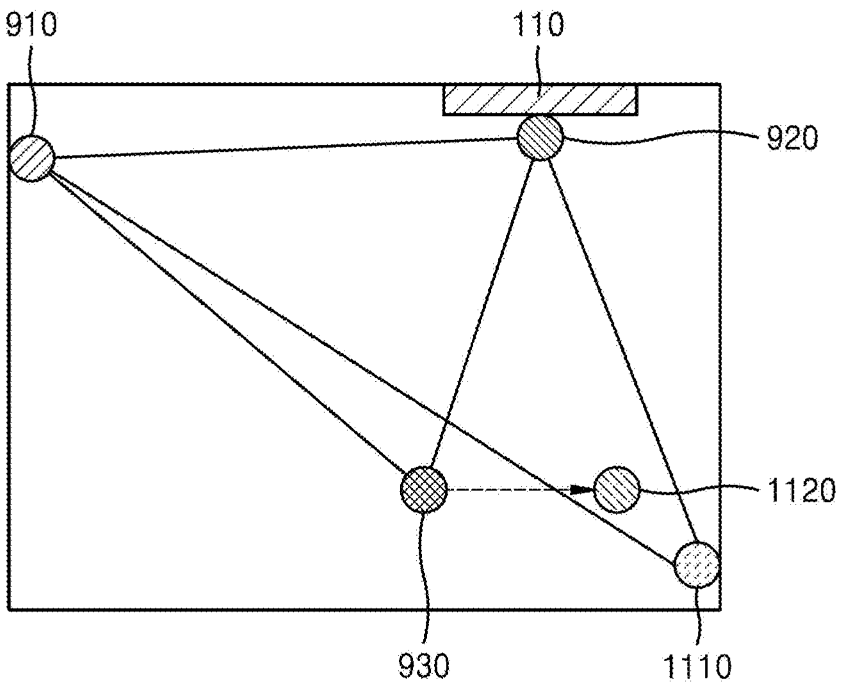
FIG. 11 is a diagram illustrating an example of obtaining a position of a newly registered example external device, according to various embodiments of the present disclosure.

FIG. 11 is a diagram illustrating obtaining of a position of a newly registered external device, according to various embodiments of the present disclosure.

A fourth tag 1110 may be attached to an external device to be newly registered. The external device having the fourth tag 1110 attached thereto may be newly registered to the anchor configured to perform UWB communication. The anchor configured to perform UWB communication may process it as if the existing external device having the third tag 930 attached thereto has moved to the position of the external device having the fourth tag 1110 attached thereto. While an operation of newly adding a new external device may not be easy depending on the performance of the UWB anchor, an operation of processing it as if an existing registered external device has moved may be easier in terms of UWB communication processing, and may be feasible regardless of the performance of the UWB anchor. The anchor configured to perform UWB communication may process it as if the existing external device having the third tag 930 attached thereto has moved to an alternative position 1120. The anchor configured to perform UWB communication may determine positions of the first tag 910, the second tag 920, and the fourth tag 1110 as being fixed. The anchor configured to perform UWB communication may calculate a position of the fourth tag 1110 based on a triangulation method.

When intending to detect a position of the user, the fourth tag 1110 may be attached to the user. The anchor configured to perform UWB communication may determine a position of the user who has attached the fourth tag 1110, based on a triangulation method.

When obtaining the first position of the at least one external device and the second position of the user in operation 410, a triangulation method may be applied. Hereinafter, an example method of obtaining a position of an external device using a triangulation method will be described with reference to FIG. 12.

Figure 12:
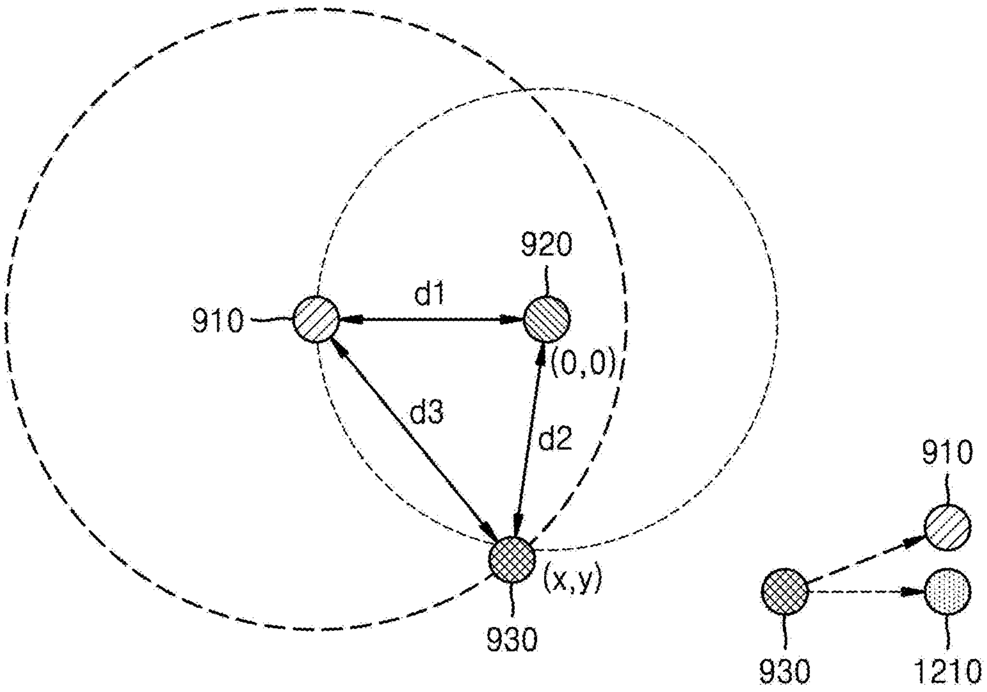
FIG. 12 is a diagram illustrating an example of obtaining a position of an example external device using triangulation, according to various embodiments of the present disclosure.

FIG. 12 is a diagram illustrating obtaining of a position of an external device by using triangulation, according to various embodiments of the present disclosure. The processor of the image display device may obtain coordinate values of an external device having the third tag 930 attached thereto, using the principle of triangulation.

A distance between the first tag 910 and the second tag 920 may be a first distance d1. When the coordinate values of the second tag 920 are (0, 0), the coordinate values of the first tag 910 may be (−d1, 0). The coordinate values of the external device to be obtained may be set to (x, y).

The processor may calculate a third distance d3 from the third tag 930 to the first tag 910. The processor may calculate the second distance d2 from the third tag 930 to the second tag 920. The processor may calculate an orientation angle formed by the second tag 920 and the third tag 930 as viewed from the first tag 910. The processor may obtain coordinate values of the external device based on the respective distances to the first tag 910, the second tag 920, and the third tag 930, and the orientation angle.

By applying the second law of cosines with respect to the orientation angle, a cosine value of the orientation angle may be calculated according to Equation 1 below.

$$\cos\alpha = \frac{d_1^2 + d_2^2 - d_3^2}{2 \times d_1 \times d_2} = \frac{x}{d_2} \quad \text{[Equation 1]}$$

By applying the law of sines with respect to the orientation angle, a sine value of the orientation angle may be calculated according to Equation 2 below.

$$\sin\alpha = \frac{y}{d_2} \quad \text{[Equation 2]}$$

The processor has determined the orientation angle, and thus may calculate x and y values, which are the coordinate values of the external device to be obtained. The cosine and sine values are used for calculating the coordinate values of the external device, and thus, two values may be calculated, such as the left coordinate value and the right coordinate value. The processor may select one of the left coordinate value and the right coordinate value depending on the user's choice.

The processor may calculate coordinate values on a two-dimensional plane, and thus may calculate coordinate axes when the first tag 910, the second tag 920, and the third tag 930 are projected onto the ground. For example, when the first tag 910 is located at a higher position than the third tag 930, the processor may set a projection 1210 of the first tag such that the first tag 910 has the same height as the third tag 930, and measure the distance from the third tag 930 to the projection 1210 of the first tag. To obtain a three-dimensional position, the processor may measure the height of the first tag 910 before projection, by measuring the tilt of the external device using an acceleration sensor.

When controlling the sensor unit to recognize the gesture of the user with respect to the at least one external device in operation 420, the sensor unit may detect a distance between the user and the at least one external device, and detect the form of the gesture of the user. Hereinafter, a structure of an example ToF sensor used to detect a distance between a user and a device, and a gesture of the user will be described with reference to FIG. 13.

Figure 13:
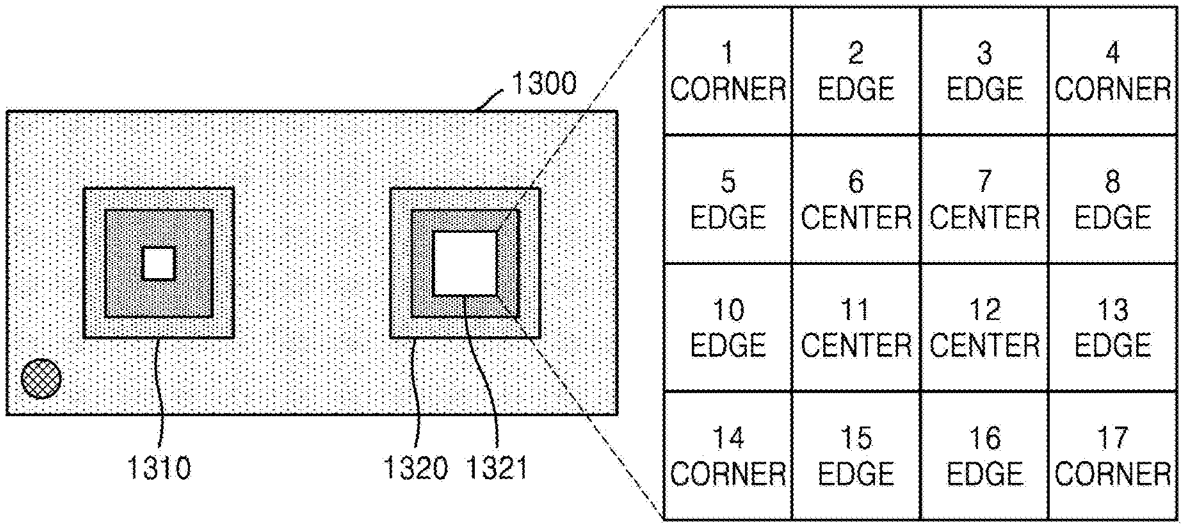
FIG. 13 is a diagram illustrating an example time-of-flight (ToF) sensor according to various embodiments of the present disclosure.

FIG. 13 is a diagram illustrating an example ToF sensor 1300 according to various embodiments of the present disclosure. FIG. 13 illustrates a top view of the ToF sensor 1300 as viewed from above. The ToF sensor 1300 may include a light-emitting unit 1310 (including, e.g., a light emitter) and a receiving unit 1320 (including, e.g., a light receiver).

The light-emitting unit 1310 may emit light toward an external device. The light-emitting unit 1310 may focus and emit light with strong straightness toward the external device. For example, the light-emitting unit 1310 may include a vertical-cavity surface-emitting laser (VCSEL) and a microlens array (MLA).

The receiving unit 1320 may receive light reflected from the external device and the user. The receiving unit 1320 may include a component capable of focusing and receiving light, and an image sensor capable of converting the received light into a digital signal. For example, the receiving unit 1320 may include a plurality of lenses and a plurality of single-photon avalanche diodes (SPADs). The ToF sensor 1300 may measure a time period it takes for light to be emitted from the light-emitting unit 1310, then reflected back from the external device and the user, and then received by the receiving unit 1320. The processor of the image display device may control the ToF sensor 1300 to obtain a distance between the external device and the user.

The receiving unit 1320 may include a detailed receiving area 1321. The detailed receiving area 1321 may include corner cells 1, 4, 14, and 17, edge cells 2, 3, 5, 8, 10, 13, 15, and 16, and center cells 6, 7, 11, and 12. The cells included in the detailed receiving area 1321 may be used to segment the light reflected from the external device and the user according to reflection points. The processor of the image display device may control the ToF sensor 1300 to detect the form of a gesture of the user with respect to the external device.

Hereinafter, operations included in an example method of displaying a virtual reality image will be described with reference to FIG. 14.

Figure 14:
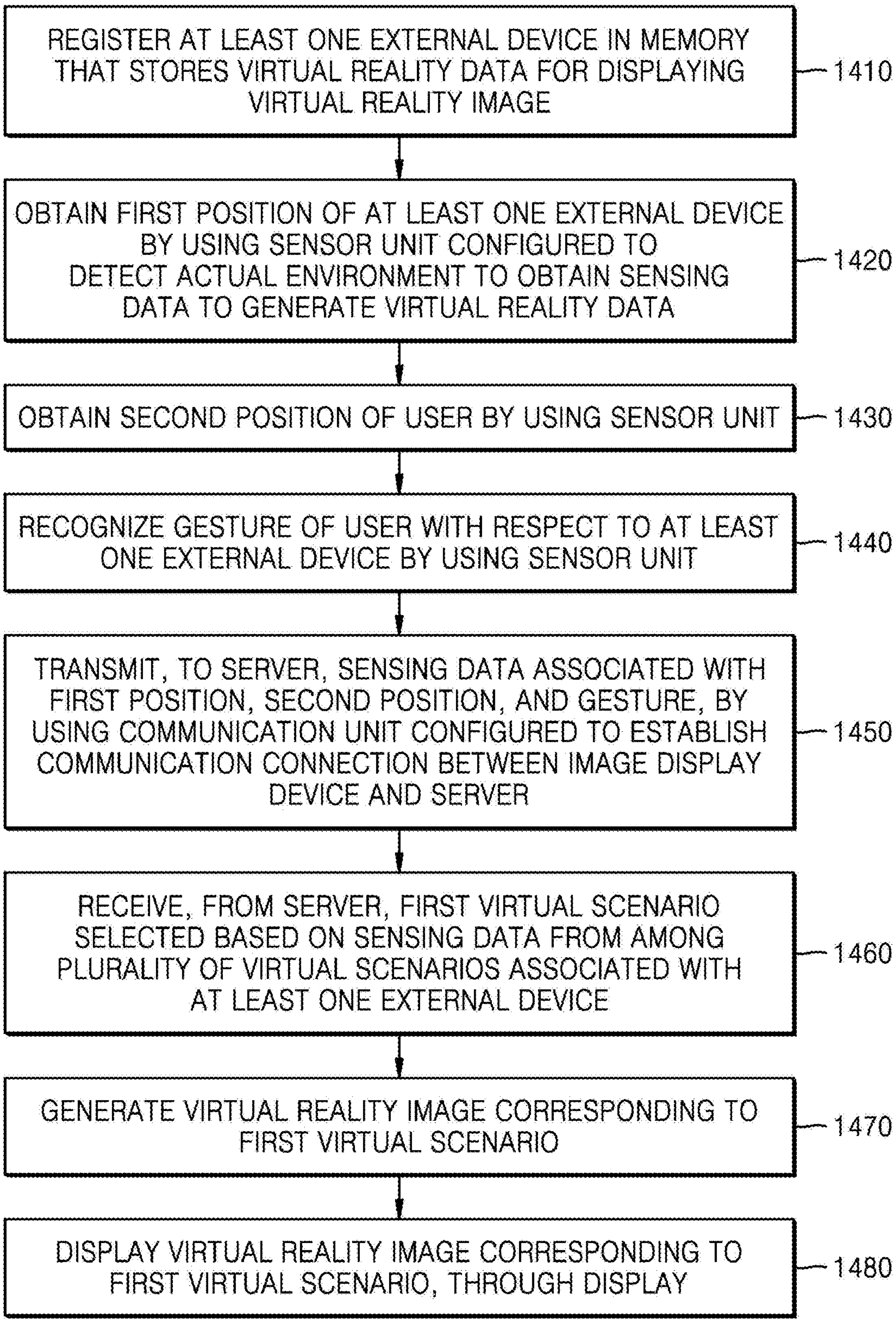
FIG. 14 is a flowchart illustrating an example display method according to various embodiments of the present disclosure.

FIG. 14 is a flowchart illustrating an example display method according to various embodiments of the present disclosure. FIG. 14 illustrates a method, performed by at least one processor of an image display device, of displaying a virtual reality image, according to an example embodiment.

According to an embodiment, in operation 1410, the at least one processor may register at least one external device in a memory that stores virtual reality data for displaying a virtual reality image. The processor may register the at least one external device in a database of a server or in a memory of the image display device. The processor may store, in the memory, virtual reality data for configuring an object and a background of a virtual reality image. The processor may additionally store information associated with the at least one external device, in the memory in which virtual reality data is stored.

The memory may store identification information associated with a type of the at least one external device. The identification information may include a product name of the at least one external device, a serial number of the at least one external device, a model name of the at least one external device, an internal structure of the at least one external device, a method of using the at least one external device, a function of the at least one external device, and/or a method of performing maintenance of the at least one external device.

In an embodiment, in operation 1420, the at least one processor may obtain a first position of the at least one external device using a sensor unit configured to detect an actual environment to obtain sensing data to generate virtual reality data. The processor may control the sensor unit to detect a position of a registered external device. The processor may calculate the position of the external device using coordinate axes based on an indoor plane. The processor may include position information about the external device in sensing data.

The sensor unit may include a UWB sensor. The sensor unit including the UWB sensor may detect a first tag attached to the at least one external device to obtain the first position. The first tag configured to emit a UWB signal may be attached to the at least one external device.

According to an embodiment, in operation 1430, the at least one processor may obtain a second position of a user using the sensor unit. The processor may control the sensor unit to detect a position of the user. The processor may calculate the position of the user using coordinate axes based on an indoor plane. The processor may include position information about the user in the sensing data. In a case in which the sensor unit includes a UWB sensor, the sensor unit may detect a second tag attached to the user to determine the second position. The second tag configured to emit a UWB signal may be attached to the user.

According to an example embodiment, in operation 1440, the at least one processor may recognize a gesture of the user with respect to the at least one external device using the sensor unit. The sensor unit may include at least one of an image sensor, a distance sensor, a ToF sensor, or an orientation sensor. The processor may control the sensor unit to recognize a gesture using at least one of an image sensor, a distance sensor, a ToF sensor, or an orientation sensor. For example, the processor may control the sensor unit to recognize a gesture of the user extending his/her hand toward the at least one external device, a gesture of the user attempting to manipulate an input unit of the at least one external device, a gesture of the user attempting to disassemble the at least one external device, and/or a gesture of the user attempting to replace a replaceable part of the at least one external device. The processor may include information associated with the recognized gesture in the sensing data.

The processor may determine an intention of the user with respect to the at least one external device, based on the gesture recognized by the sensor unit. For example, for the gesture of the user attempting to manipulate the input unit of the at least one external device, the processor may determine that the user intends to use the at least one external device and execute a function of the external device. For example, for the gesture of the user disassembling the at least one external device, the processor may determine that the user intends to check an internal structure of the at least one external device. For example, for the gesture of the user attempting to replace the replaceable part of the at least one external device, the processor may determine that the user intends to perform maintenance of the at least one external device.

According to an example embodiment, in operation 1450, the at least one processor may transmit, to a server, sensing data associated with the first position, the second position, and the gesture, using a communication unit configured to establish a communication connection between the image display device and the server. The processor may control the communication unit to transmit, to the server, the sensing data generated by the sensor unit. The server may receive the sensing data and execute an algorithm for processing the sensing data.

According to an example embodiment, in operation 1460, the at least one processor may receive, from the server, a first virtual scenario selected based on the sensing data from among a plurality of virtual scenarios associated with the at least one external device. The server may, for example, select the first virtual scenario from among the plurality of virtual scenarios, based on the sensing data. The processor may control the communication unit to receive, from the server, the selected first virtual scenario.

The database of the server may store the plurality of virtual scenarios. When the server receives the sensing data and the algorithm is executed, the server may select the first virtual scenario that matches the sensing data from among the plurality of virtual scenarios.

The plurality of virtual scenarios may be associated with guiding the user through use of a function of the at least one external device, an internal structure of the at least one external device when disassembled, replacing a component of the at least one external device, and/or repairing the at least one external device. The server may select, from among the plurality of virtual scenarios, the first virtual scenario that matches the intention of the user corresponding to the gesture of the user included in the sensing data. For example, when the sensing data includes a gesture of the user attempting to manipulate an input unit of the at least one external device, the server may select, as the first virtual scenario, guiding the user through use of a function of the at least one external device. For example, when the sensing data includes a gesture of the user attempting to disassemble the at least one external device, the server may select, as the first virtual scenario, an internal structure of the at least one external device when disassembled. For example, when the sensing data includes a gesture of the user attempting to replace a replaceable part of the at least one external device, the server may select, as the first virtual scenario, replacing of a part of the at least one external device and repairing the at least one external device.

When selecting the first virtual scenario from among the plurality of virtual scenarios by executing the algorithm, the server may use artificial intelligence (AI) to select a more accurate virtual scenario that matches the intention of the user. The server may collect sensing data and input the sensing data into a model of the user. The model may be an artificial intelligence learning model to which a machine learning (ML) method is applied. The model may be an artificial intelligence learning model to which a deep learning method is applied. The model may be an artificial intelligence learning model to which a big data method is applied. The server may train the model to learn the frequency of proximity between the user's hand making a gesture and the at least one external device, the shape of a hand, and/or a position pattern between a hand and the at least one external device, based on sensing data. The server may repeatedly input frequencies of proximity, hand shapes, and/or hand position patterns, into the model. The server may train the model to group similar shapes and similar patterns from among hand shapes and hand position patterns. The server may apply various cases to train the model to associate hand shapes and hand position patterns with intentions of users with respect to the at least one external device. The server may select the first virtual scenario among the plurality of virtual scenarios using the trained model.

According to an example embodiment, in operation 1470, the at least one processor may generate a virtual reality image corresponding to the first virtual scenario. The first virtual scenario may include content associated with the at least one external device. For example, the first virtual scenario may include at least one of guiding the user through a method of using the at least one external device, guiding the user through an internal structure of the at least one external device, guiding the user through a function of the at least one external device, or guiding the user through maintenance of the at least one external device. The processor may generate a virtual reality image that may represent the content associated with the at least one external device according to the first virtual scenario.

According to an example embodiment, in operation 1480, the at least one processor may display the virtual reality image corresponding to the first virtual scenario, through a display. The processor may control the display to display the generated virtual reality image.

The processor may control the display to display virtual reality images showing methods for use, disassembly, part replacement, and/or repair of the at least one external device, according to the first virtual scenario. For example, when the first virtual scenario is guiding the user through use of a function of the at least one external device, the processor may control the display to display a virtual reality image showing a method of using the at least one external device. For example, when the first virtual scenario is a structure of an interior of the at least one external device when disassembled, the processor may control the display to display a virtual reality image showing an image of the at least one external device when disassembled. For example, when the first virtual scenario is replacement of a component of the at least one external device, the processor may control the display to display a virtual reality image showing a method of replacing a component of the at least one external device. For example, when the first virtual scenario is repair of the at least one external device, the processor may control the display to display a virtual reality image showing a method of repairing the at least one external device.

The processor may control the display to display a virtual reality image showing a modified form of the at least one external device according to the first virtual scenario. For example, when the first virtual scenario is guiding the user through use of a function of the at least one external device, the processor may control the display to display a virtual reality image showing a structure of the at least one external device, an output form of the at least one external device, and/or a function execution state of the at least one external device when the at least one external device is used. For example, when the first virtual scenario is replacement of a part of the at least one external device, the processor may control the display to display a virtual reality image showing the at least one external device before the part replacement, during the part replacement, and after the part replacement.

Hereinafter, an example process in which an image display device transmits sensing data to a server and receives, from the server, a virtual scenario selected based on the sensing data will be described with reference to FIG. 15.

Figure 15:
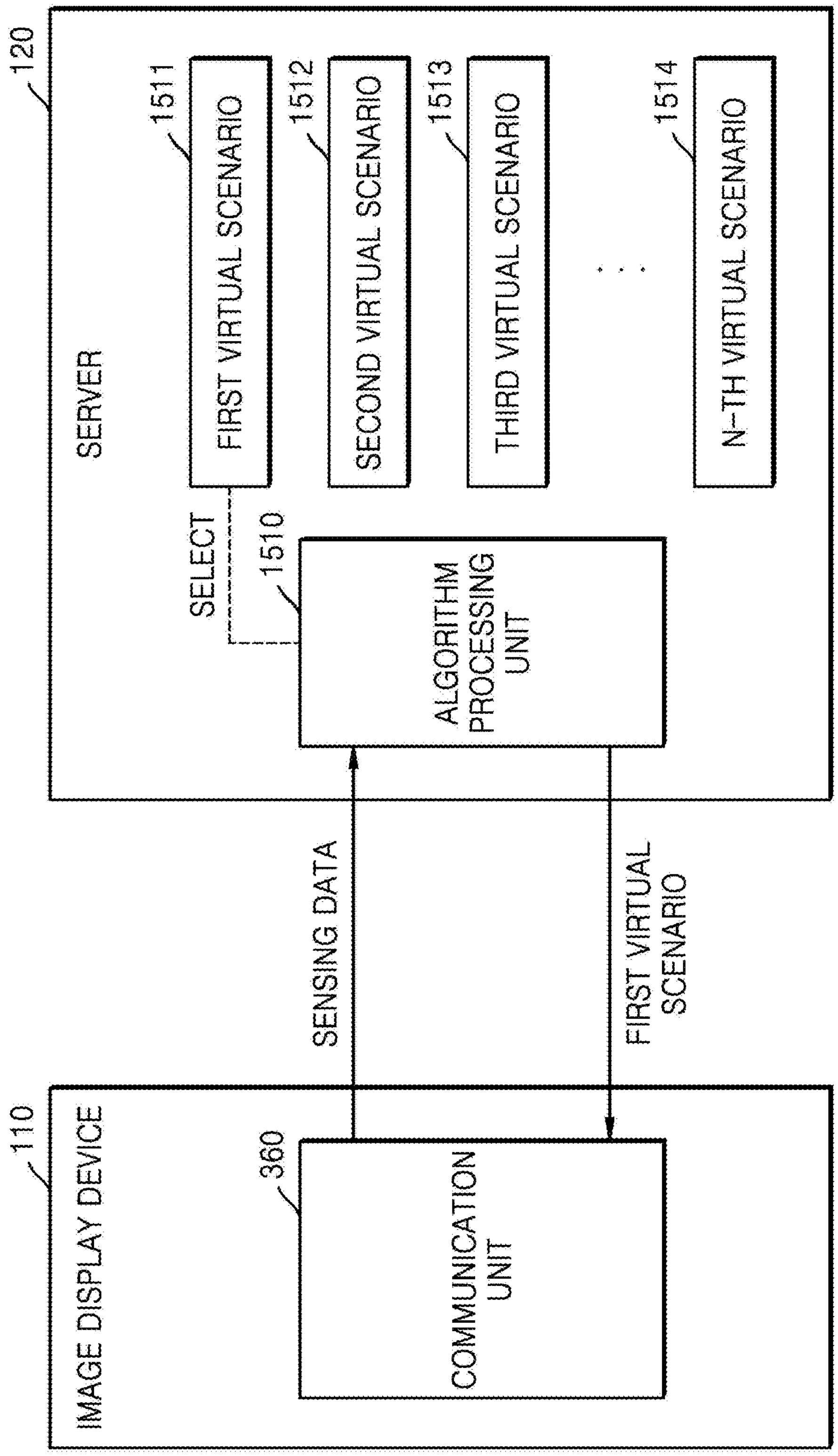
FIG. 15 is a diagram illustrating an example process in which an example image display device transmits sensing data to a server, and receives, from the server, a virtual scenario selected based on the sensing data, according to various embodiments of the present disclosure.

FIG. 15 is a diagram illustrating an example process in which the image display device 110 transmits sensing data to the server 120, and receives, from the server 120, a virtual scenario selected based on the sensing data, according to various embodiments of the present disclosure.

The communication unit 360 of the image display device 110 may transmit sensing data to the server 120. The sensing data may include, for example, a first position of at least one external device, a second position of a user, and a gesture of the user with respect to the at least one external device.

An algorithm processing unit 1510 of the server 120 may receive the sensing data. The algorithm processing unit 1510 may analyze the received sensing data by executing an algorithm. The algorithm may be an integrated sensing algorithm. The algorithm may be an artificial intelligence algorithm that includes a model that learns from sensing data. The algorithm processing unit 1510 may analyze the sensing data using the algorithm to determine an intention of the user. The intention of the user may be associated with what the user wants to know or do in relation to the at least one external device. For example, when the sensing data includes a gesture of the user attempting to manipulate an input unit of the at least one external device, the algorithm processing unit 1510 may determine that the user intends to use the at least one external device. For example, when the sensing data includes a gesture of the user attempting to open the rear surface or lower surface of the at least one external device, the algorithm processing unit 1510 may determine that the user intends to disassemble the at least one external device.

The algorithm processing unit 1510 may select a virtual scenario that may satisfy the intention of the user determined based on the sensing data. A plurality of virtual scenarios 1511, 1512, 1513, and 1514 may be stored in the database of the server 120. The algorithm processing unit 1510 may select a first virtual scenario 1511 that provides information that matches the determined intention of the user, from among the plurality of virtual scenarios 1511, 1512, 1513, and 1514. For example, the algorithm processing unit 1510 may determine that the intention of the user is to use the at least one external device, and select a virtual scenario for guiding the user through a method of using the at least one external device. For example, the algorithm processing unit 1510 may determine that the intention of the user is to disassemble the at least one external device, and select a virtual scenario for showing an internal structure of the at least one external device when disassembled.

Hereinafter, an example method of displaying a virtual reality image for explaining an operation of a device will be described with reference to FIGS. 16 and 17.

Figure 16:
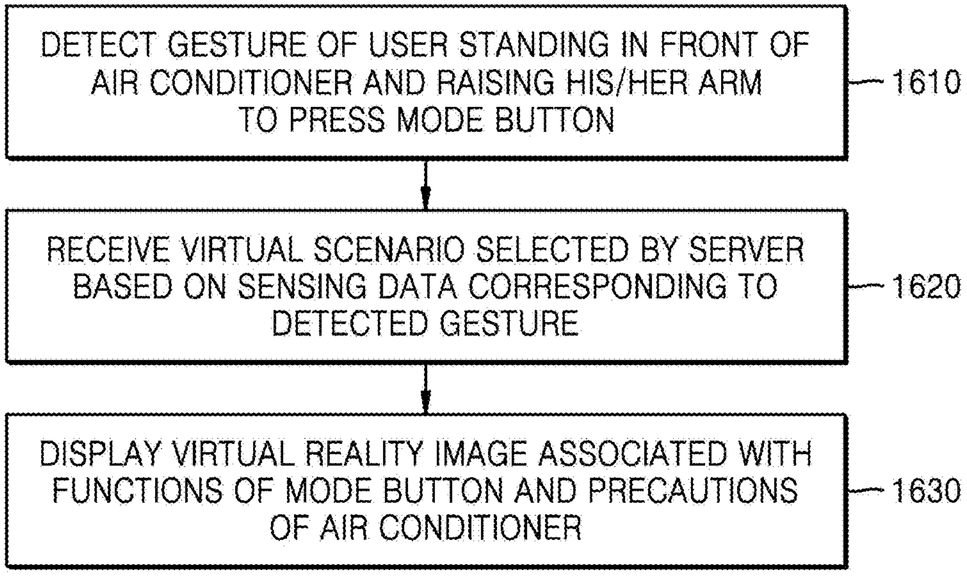
FIG. 16 is a flowchart illustrating an example method of displaying a function of an air conditioner, according to various embodiments of the present disclosure.

FIG. 16 is a flowchart illustrating an example method of displaying a function of an air conditioner, according to various embodiments of the present disclosure.

According to an example embodiment, in operation 1610, the image display device 110 may detect, using the sensor unit, a gesture of the user standing in front of an air conditioner and raising his/her arm to press a mode button. The distance sensor included in the sensor unit may detect the user being in the proximity of the front of the air conditioner. The ToF sensor included in the sensor unit may detect a motion of the user raising his/her arm, and a motion of the user attempting to press a mode button of the air conditioner. The image display device 110 may control the sensor unit to detect sensing data indicating that the user is performing a gesture of standing in front of the air conditioner and raising his/her arm to press the mode button.

According to an example embodiment, in operation 1620, the image display device 110 may receive a virtual scenario selected by the server based on sensing data corresponding to the detected gesture.

According to an embodiment, the image display device 110 may receive, from the server, the virtual scenario that is selected in correspondence with the sensing data in response to transmitting the sensing data detected by the sensor unit to the server. The server may determine that the user has performed a gesture of standing in front of the air conditioner and raising his/her arm to press the mode button. Based on the gesture of standing in front of the air conditioner and raising his/her arm to press the mode button, the server may determine that the user intends to press the mode button of the air conditioner to execute a function of the air conditioner. The server may select a virtual scenario corresponding to the intention of the user from among the plurality of virtual scenarios, and transmit the selected virtual scenario to the image display device 110. For example, the server may select a virtual scenario associated with guidance on a function of the air conditioner, which corresponds to the intention of the user to execute the function of the air conditioner.

According to an example embodiment, the image display device 110 may select by itself a virtual scenario in correspondence with the sensing data detected by the sensor unit, without transmitting the sensing data to the server. The image display device 110 may determine that the user has performed a gesture of standing in front of the air conditioner and raising his/her arm to press the mode button. Based on the gesture of standing in front of the air conditioner and raising his/her arm to press the mode button, the image display device 110 may determine that the user intends to press the mode button of the air conditioner to execute a function of the air conditioner. The image display device 110 may select a virtual scenario that corresponds to the intention of the user from among a plurality of virtual scenarios. For example, the server may select a virtual scenario associated with guidance on a function of the air conditioner, which corresponds to the intention of the user to execute the function of the air conditioner.

According to an example embodiment, in operation 1630, the image display device 110 may use the display to display a virtual reality image showing what functions the mode button has and what role each of the functions plays. For example, the processor may control the display to display a virtual reality image for guiding the user through content that the mode button has, for example, an operation start function, a wind intensity adjustment function, a temperature adjustment function, a mode selection function, and/or a reservation function. For example, the processor may control the display to display a virtual reality image that instructs the user that the operation start function is for starting the operation of the air conditioner. For example, the processor may control the display to display a virtual reality image for guiding the user through content that the wind intensity adjustment function plays a role in selecting the intensity of wind output from the air conditioner from among a low level, a middle level, and a high level. For example, the processor may control the display to display a virtual reality image for guiding the user through content that the temperature adjustment function plays a role in increasing or decreasing the indoor temperature to be implemented using the air conditioner. For example, the processor may control the display to display a virtual reality image for guiding the user through content that the mode selection function plays a role in selecting one of a cooling mode, a blowing mode, and/or a dehumidifying mode. For example, the processor may control the display to display a virtual reality image for guiding the user through content that the reservation function plays a role in setting the use termination time of the air conditioner.

According to an example embodiment, the image display device 110 may display, using the display, a virtual reality image showing how the surrounding environment of the air conditioner will change according to each function, and the precautions. For example, the processor may control the display to display a virtual reality image for guiding the user through an expected indoor temperature change during the operation of the air conditioner. For example, the processor may control the display to display a virtual reality image for guiding the user through the precautions that it is impossible to set the intensity of the air conditioner to be higher than or equal to a threshold intensity or to lower the temperature to be lower than or equal to a threshold temperature.

Figure 17:
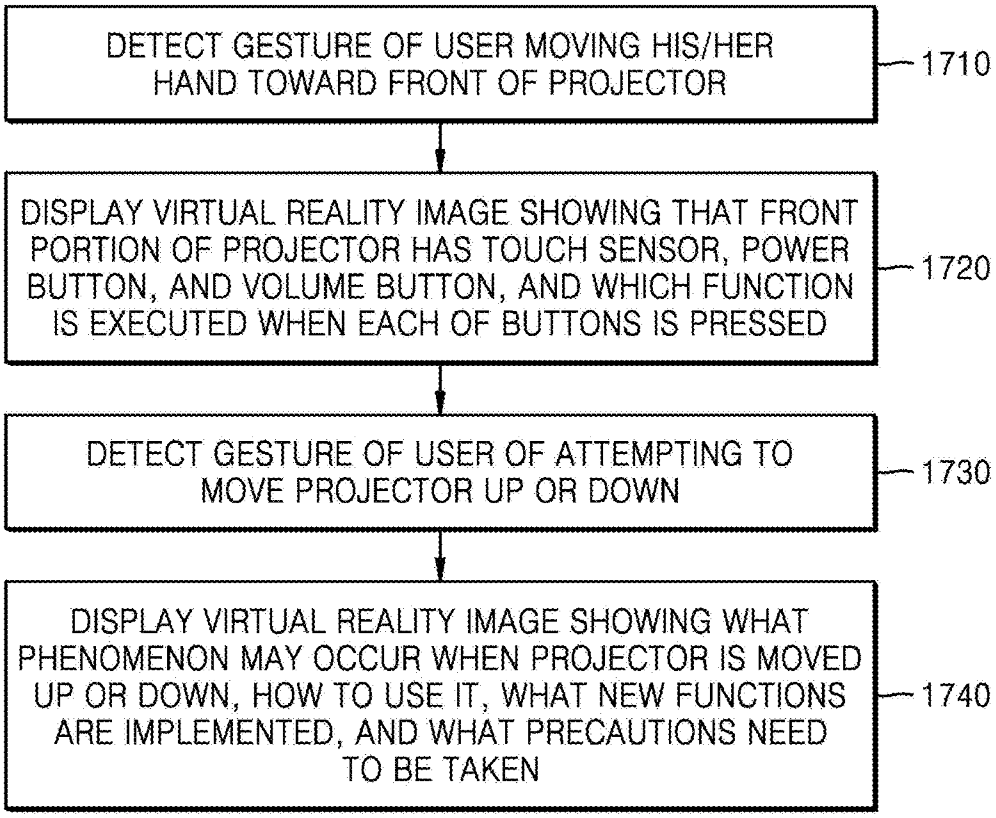
FIG. 17 is a flowchart illustrating an example method of displaying a function of a projector, according to various embodiments of the present disclosure.

FIG. 17 is a flowchart illustrating an example method of displaying a function of a projector, according to various embodiments of the present disclosure. The projector may be a device for displaying a screen and an image by emitting beams onto a screen surface. For example, the projector may be a portable beam projector such as Freestyle.

According to an example embodiment, in operation 1710, the image display device 110 may detect, by using the sensor unit, a gesture of the user moving his/her hand toward the front of the projector. The distance sensor included in the sensor unit may detect the user's hand being in the proximity of the front of the projector. The ToF sensor included in the sensor unit may detect the user's hand moving toward the front of the projector. The processor may control the sensor unit to generate sensing data including information that the user has performed a gesture of moving his/her hand toward the front of the projector.

According to an example embodiment, the image display device 110 may transmit the sensing data to the server. The server may determine that the intention of the user is to use the projector, based on the gesture of the user moving his/her hand toward the front of the projector, and select a virtual scenario for guiding the user through a method of using the projector, to correspond to the intention of the user. The image display device 110 may receive the selected virtual scenario from the server.

According to an example embodiment, in operation 1720, an image display device 110 may display, using the display, a virtual reality image showing that a front portion of the projector has a touch sensor, a power button, and/or a volume button, and which function is executed when each of the buttons is pressed. The image display device 110 may display a virtual reality image corresponding to a virtual scenario for guiding the user through a method of using the projector. For example, the processor may control the display to display a virtual reality image showing the position of each of the touch sensor, the power button, and the volume button in the front portion of the projector. For example, the processor may control the display to display a virtual reality image showing functions of displaying a detailed menu when pressing the touch sensor, starting or ending screen transmission when pressing the power button, and adjusting the volume for an image when pressing the volume button.

According to an example embodiment, in operation 1730, the processor may detect, using the sensor unit, a gesture of the user of attempting to move the projector up or down. The distance sensor included in the sensor unit may detect the user's hand being in the proximity of the projector. The ToF sensor included in the sensor unit may detect a motion of the user attempting to move the projector up or down. The processor may control the sensor unit to generate sensing data including information that the user has performed a gesture of attempting to move the projector up or down.

According to an example embodiment, the image display device 110 may transmit the sensing data to the server. The server may determine that the intention of the user is to adjust the direction or height of the projector, based on the gesture of the user attempting to move the projector up or down, and select a virtual scenario for providing guidance on functions and precautions when moving the projector up or down, to correspond to the intention of the user. The image display device may receive the selected virtual scenario from the server.

According to an example embodiment, in operation 1740, the image display device 110 may, display, using the display, a virtual reality image showing what phenomenon may occur when the projector is moved up or down, how to use it, what new functions are implemented, and/or what precautions need to be taken. The image display device 110 may display a virtual reality image corresponding to a virtual scenario for guiding the user through functions and precautions when the projector is moved up or down. For example, the processor may control the display to display a virtual reality image for guiding the user through expected changes in the appearance of an image being displayed when the projector is moved up or down. For example, the processor may control a display to display a virtual reality image for guiding the user on which parts to hold to move the projector up or down. For example, the processor may control the display to display a virtual reality image showing that moving the projector up or down invokes a new feature of displaying a pop-up screen. For example, the processor may control the display to display a virtual reality image showing a precaution that the projector cannot be moved up or down beyond a threshold angle range.

Hereinafter, an example method of displaying a virtual reality image for explaining a method of performing maintenance of a device will be described with reference to FIGS. 18, 19, and 20.

Figure 18:
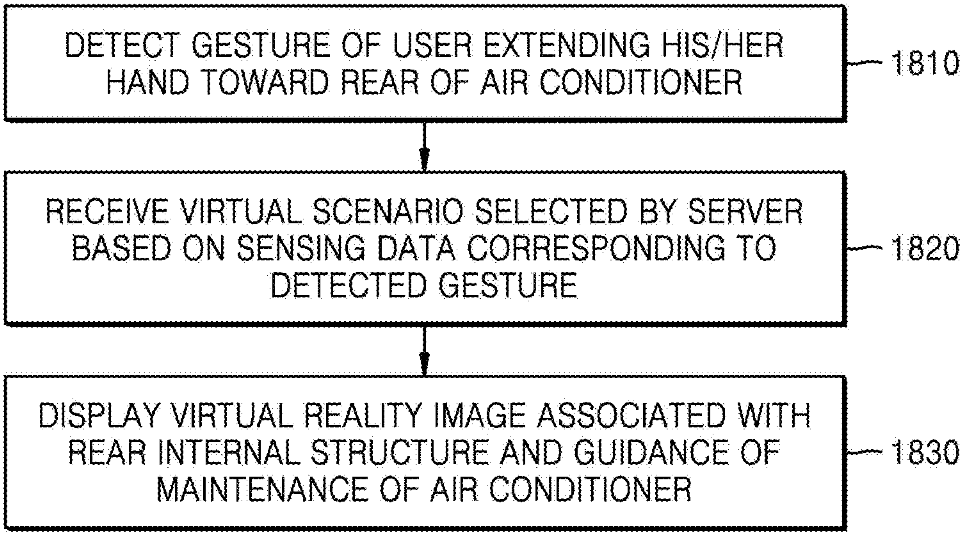
FIG. 18 is a flowchart illustrating an example method of displaying a maintenance function of an air conditioner, according to various embodiments of the present disclosure.

FIG. 18 is a flowchart illustrating an example method of displaying a maintenance function of an air conditioner, according to various embodiments of the present disclosure.

According to an example embodiment, in operation 1810, the image display device 110 may detect, using the sensor unit, a gesture of the user extending his/her hand toward the rear of an air conditioner. The distance sensor included in the sensor unit may detect the user being in the proximity of the rear of the air conditioner. The ToF sensor included in the sensor unit may detect the user extending his/her hand toward the rear of the air conditioner. The processor may control the sensor unit to generate sensing data including information that the user has performed a gesture of extending his/her hand toward the rear of the air conditioner.

According to an example embodiment, in operation 1820, the image display device 110 may receive a virtual scenario selected by the server based on sensing data corresponding to the detected gesture. The image display device 110 may transmit the sensing data to the server. The server may determine that the intention of the user is to open a rear portion of the air conditioner, inspect the interior of the rear portion, and replace a filter, which is a replaceable part, based on the gesture of the user extending his/her hand toward the rear portion of the air conditioner. The server may select a virtual scenario for showing a rear internal structure and guiding the user through a method of replacing a filter, to correspond to the intention of the user. The image display device 110 may receive the selected virtual scenario from the server.

According to an example embodiment, in operation 1830, the image display device 110 may display a virtual reality image associated with the rear internal structure and guidance of maintenance of the air conditioner.

According to an example embodiment, the image display device 110 may display, using the display, a virtual reality image showing what the rear portion of the air conditioner looks like when it is opened. For example, the processor may control the display to display a virtual reality image for guiding the user through what the rear portion looks like when opened and each component in that view.

According to an example embodiment, the image display device 110 may display, using the display, a virtual reality image showing maintenance functions that may be performed on the air conditioner, such as replacing a filter of the air conditioner. For example, the processor may control the display to display a virtual reality image for showing that maintenance tasks that the user may perform after opening the rear portion of the air conditioner include replacing a filter. For example, the processor may control the display to display a virtual reality image for guiding the user through a method of manually replacing a filter in the air conditioner.

Figure 19:
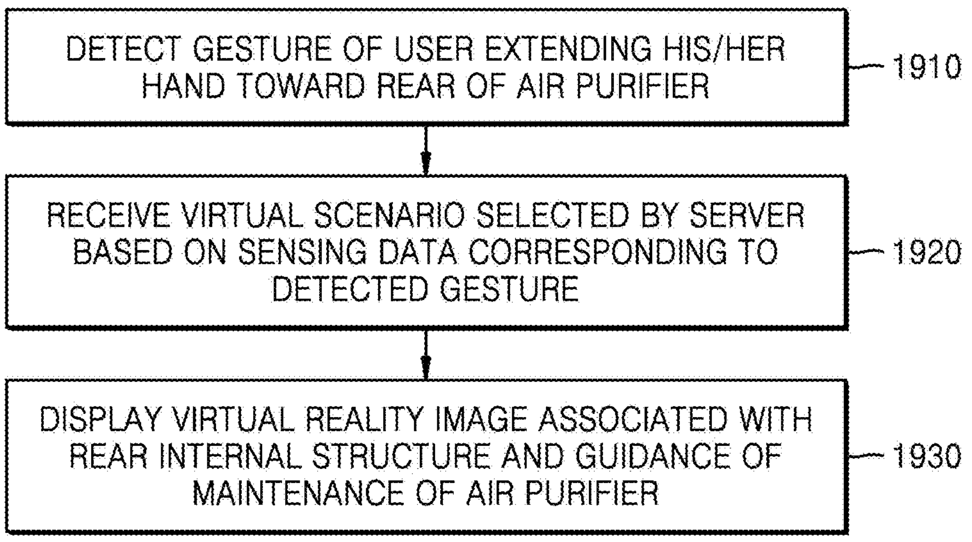
FIG. 19 is a flowchart illustrating an example method of displaying a maintenance function of an air purifier, according to various embodiments of the present disclosure.

FIG. 19 is a flowchart illustrating an example method of displaying a maintenance function of an air purifier, according to various embodiments of the present disclosure.

According to an example embodiment, in operation 1810, the image display device 110 may detect, using the sensor unit, a gesture of the user extending his/her hand toward the rear of an air purifier. The distance sensor included in the sensor unit may detect the user being in the proximity of the rear of the air purifier. The ToF sensor included in the sensor unit may detect the user extending his/her hand toward the rear of the air purifier. The processor may control the sensor unit to generate sensing data including information that the user has performed a gesture of extending his/her hand toward the rear of the air purifier.

According to an example embodiment, in operation 1920, the image display device 110 may receive a virtual scenario selected by the server based on sensing data corresponding to the detected gesture. The image display device 110 may transmit the sensing data to the server. The server may determine that the intention of the user is to open a rear portion of the air purifier, inspect the interior of the rear portion, and clean the air purifier, based on the gesture of the user extending his/her hand toward the rear portion of the air purifier. The server may select a virtual scenario for showing a rear internal structure and guiding the user through a method of replacing a filter, to correspond to the intention of the user. The image display device 110 may receive the selected virtual scenario from the server.

According to an example embodiment, in operation 1930, the image display device 110 may display a virtual reality image associated with the rear internal structure and guidance of maintenance of the air purifier.

According to an example embodiment, the image display device 110 may display, using the display, a virtual reality image showing what the rear portion of the air purifier looks like when it is opened. For example, the processor may control the display to display a virtual reality image for guiding the user through what the rear portion looks like when opened and each component in that view.

According to an example embodiment, the image display device 110 may display, using the display, a virtual reality image showing maintenance functions that may be performed on the air purifier, such as cleaning of the air purifier. For example, the processor may control the display to display a virtual reality image for showing that maintenance tasks that the user may perform after opening the rear portion of the air purifier include cleaning. For example, the processor may control the display to display a virtual reality image for guiding the user through a method of manually cleaning the air purifier.

Figure 20:
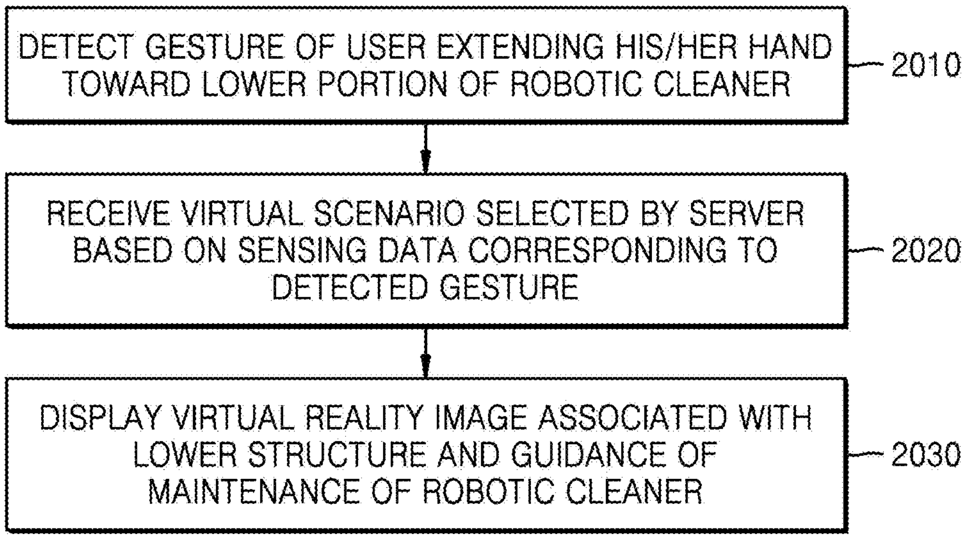
FIG. 20 is a flowchart illustrating an example method of displaying a maintenance function of a robotic cleaner, according to various embodiments of the present disclosure.

FIG. 20 is a flowchart illustrating an example method of displaying a maintenance function of a robotic cleaner, according to various embodiments of the present disclosure.

According to an example embodiment, in operation 2010, the processor may detect, using the sensor unit, a gesture of the user extending his/her hand toward a lower portion of the robotic cleaner. The distance sensor included in the sensor unit may detect the user being in the proximity of the robotic cleaner. The ToF sensor included in the sensor unit may detect the user extending his/her hand toward the lower portion of the robotic cleaner. The processor may control the sensor unit to generate sensing data including information that the user has performed a gesture of extending his/her hand toward the lower portion of the robotic cleaner.

According to an example embodiment, in operation 2020, the image display device 110 may receive a virtual scenario selected by the server based on sensing data corresponding to the detected gesture. The image display device 110 may transmit the sensing data to the server. The server may determine that the intention of the user is to open the lower portion of the robotic cleaner, inspect the interior of the lower portion, and remove foreign substances from the lower portion of the robotic cleaner, based on a gesture of the user extending his/her hand toward the lower portion of the robotic cleaner. The server may select a virtual scenario for showing a rear internal structure and guiding the user through a method of replacing a filter, to correspond to the intention of the user. The image display device 110 may receive the selected virtual scenario from the server.

According to an example embodiment, in operation 2030, the image display device 110 may display a virtual reality image associated with the lower structure and guidance of maintenance of the robotic cleaner.

According to an example embodiment, the image display device 110 may display, using the display, a virtual reality image showing what the lower portion of the robotic cleaner looks like when it is opened. For example, the processor may control the display to display a virtual reality image for guiding the user through what the lower portion looks like when opened and each component in that view.

According to an example embodiment, the image display device 110 may display, using the display, a virtual reality image showing maintenance functions that may be performed on the robotic cleaner, such as removing foreign substances from the robotic cleaner. For example, the processor may control the display to display a virtual reality image for showing that maintenance tasks that the user may perform after opening the rear portion of the robotic cleaner include removing foreign substances. For example, the processor may control the display to display a virtual reality image for guiding the user through a method of manually removing foreign substances from the robotic cleaner.

According to an example embodiment of the present disclosure, an image display device and a display method thereof can, for example, provide a user with a virtual space experience based on an actual situation at an actual position when the user attempts various manipulations of an external device in an actual space, such as use, disassembly, replacement, or repair.

According to an example embodiment of the present disclosure, an image display device may include a display; a sensor unit (including, e.g., a sensor); a communication unit (including, e.g., a communication circuit); memory storing one or more instructions; and at least one processor configured to execute the one or more instructions, wherein the at least one processor is further configured to control the sensor unit to obtain a first position of at least one external device, and a second position of a user, control the sensor unit to recognize a gesture of the user with respect to the at least one external device, control the communication unit to transmit, to a server, sensing data associated with the first position, the second position, and the gesture of the user with respect to the at least one external device, control the communication unit to receive, from the server, a first virtual scenario that is selected, based on the sensing data, from among a plurality of virtual scenarios associated with the at least one external device, and control the display to display a virtual reality image that reflects the first virtual scenario.

In an example embodiment, the memory may store identification information associated with a type of the at least one external device.

In an example embodiment, the sensor unit may include a UWB sensor.

In an example embodiment, the UWB sensor may obtain the first position by detecting a first tag attached to the at least one external device, and obtain the second position by detecting a second tag attached to the user.

In an example embodiment, the gesture may be recognized using at least one of an image sensor, a distance sensor, a ToF sensor, or an orientation sensor, which are included in the sensor unit.

In an example embodiment, at least one processor may control the communication unit to receive, from the server, the first virtual scenario that is selected by determining, based on the gesture, an intention of the user associated with the at least one external device.

In an example embodiment, the plurality of virtual scenarios may be associated with guidance on use of a function of the at least one external device, an internal structure of the at least one external device when disassembled, replacement of a part in the at least one external device, and/or repair of the at least one external device.

In an example embodiment, the sensing data may be input into a model of the server to be used to train the model to learn, from the sensing data, a frequency of proximity between a hand of the user performing the gesture and the at least one external device, a shape of the hand, and a position pattern between the hand and the at least one external device, and the first virtual scenario may be selected from among the plurality of virtual scenarios using the trained model.

In an example embodiment, at least one processor may control the display to display the virtual reality image showing at least one of a method of using the at least one external device, a method of disassembling the at least one external device, a method of replacing a part in the at least one external device, or a method of repairing the at least one external device, according to the first virtual scenario.

In an example embodiment, at least one processor may control the display to display the virtual reality image showing a modified form of the at least one external device according to the first virtual scenario.

According to an example embodiment of the present disclosure, a display method of an image display device may include controlling a sensor unit of the image display device to obtain a first position of at least one external device, and a second position of a user; controlling the sensor unit to recognize a gesture of the user with respect to the at least one external device; control a communication unit of the image display device to transmit, to a server, sensing data associated with the first position, the second position, and the gesture of the user with respect to the at least one external device; controlling the communication unit to receive, from the server, a first virtual scenario that is selected, based on the sensing data, from among a plurality of virtual scenarios associated with the at least one external device; and control a display of the image display device to display a virtual reality image that reflects the first virtual scenario.

In an example embodiment, memory of the image display device may store identification information associated with a type of the at least one external device.

In an example embodiment, the sensor unit may include a UWB sensor.

In an example embodiment, the UWB sensor may obtain the first position by detecting a first tag attached to the at least one external device, and obtain the second position by detecting a second tag attached to the user.

In an example embodiment, the gesture may be recognized using at least one of an image sensor, a distance sensor, a ToF sensor, or an orientation sensor, which are included in the sensor unit.

In an example embodiment, the controlling of the communication unit to receive the first virtual scenario from the server may include controlling the communication unit to receive, from the server, the first virtual scenario that is selected by determining, based on the gesture, an intention of the user associated with the at least one external device.

In an example embodiment, the plurality of virtual scenarios may be associated with guidance on use of a function of the at least one external device, an internal structure of the at least one external device when disassembled, replacement of a part in the at least one external device, and/or repair of the at least one external device.

In an example embodiment, the sensing data may be input into a model of the server to be used to train the model to learn, from the sensing data, a frequency of proximity between a hand of the user performing the gesture and the at least one external device, a shape of the hand, and a position pattern between the hand and the at least one external device, and the first virtual scenario may be selected from among the plurality of virtual scenarios using the trained model.

In an example embodiment, the controlling of the display to display the virtual reality image that reflects the first virtual scenario may include controlling the display to display the virtual reality image showing at least one of a method of using the at least one external device, a method of disassembling the at least one external device, a method of replacing a part in the at least one external device, and/or a method of repairing the at least one external device, according to the first virtual scenario.

In an example embodiment, the controlling of the display to display the virtual reality image that reflects the first virtual scenario may include controlling the display to display the virtual reality image showing a modified form of the at least one external device according to the first virtual scenario.

According to an example embodiment of the present disclosure, an image display device and a display method thereof can, for example, provide a user with a virtual space experience based on an actual situation at an actual position by showing a manipulation scenario for an external device when the user attempts various manipulations of the external device in an actual space, such as use, disassembly, replacement, or repair.

A method according to various embodiments of the present disclosure may be embodied as program commands executable by various computer devices, and recorded on one or more computer-readable media. The computer-readable media may include program commands, data files, data structures, or the like separately or in combinations. The program commands to be recorded on the media may be specially designed and configured for the present disclosure or may be well-known to and be usable by those skill in the art of computer software. Examples of the computer-readable recording medium include magnetic media such as hard disks, floppy disks, or magnetic tapes, optical media such as a compact disc read-only memory (CD-ROM) or a digital video disc (DVD), magneto-optical media such as a floptical disk, and hardware devices such as read-only memory (ROM), random-access memory (RAM), or flash memory, which are specially configured to store and execute program instructions. Examples of program instructions include not only machine code, such as code made by a compiler, but also high-level language code that is executable by a computer by using an interpreter or the like.

Some example embodiments of the present disclosure may be implemented as one or more recording media including computer-readable instructions such as a computer-executable program module. The computer-readable media may include any available medium which is accessible by a computer, and may include a volatile or non-volatile medium and a removable or non-removable medium. Also, the computer-readable media may include a computer storage medium and a communication medium. The computer storage media include both volatile and non-volatile, removable and non-removable media implemented in any method or technique for storing information such as computer-readable instructions, data structures, program modules or other data. The communication media typically include computer-readable instructions, data structures, program modules, other data of a modulated data signal, or other transmission mechanisms, and examples thereof include an arbitrary information transmission medium. Also, some embodiments of the present disclosure may be implemented as a computer program or a computer program product including computer-executable instructions such as a computer program executed by a computer.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the 'non-transitory storage medium' may include a buffer in which data is temporarily stored.

According to an example embodiment, methods according to various embodiments disclosed herein may be included in a computer program product and then provided. The computer program product may be traded as commodities between sellers and buyers. The computer program product may be distributed in the form of a machine-readable storage medium (e.g., a CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An image display device comprising:

a display;

a sensor;

a communication circuit; and memory storing one or more instructions; and at least one processor, comprising processing circuitry, wherein the one or more instructions, when executed by the at least one processor, cause the image display device to:

obtain, via the sensor, a first position of at least one external device, and a second position of a user, recognize a gesture of the user directed to the at least one external device, transmit, to a server, via the communication circuit, sensing data associated with the first position, the second position, and the gesture of the user, receive, from the server, via the communication circuit, a first virtual scenario selected, based on the sensing data, from among a plurality of virtual scenarios associated with the at least one external device, and display, via the display, a virtual reality image that reflects the first virtual scenario.

2. The image display device of claim 1, wherein memory stores identification information associated with a type of the at least one external device.

3. The image display device of claim 1, wherein the sensor comprises an ultra-wideband (UWB) sensor.

4. The image display device of claim 3, wherein the UWB sensor is configured to obtain the first position by detecting a first tag attached to the at least one external device, and obtain the second position by detecting a second tag attached to the user.

5. The image display device of claim 1, wherein the sensor comprises at least one of an image sensor, a distance sensor, a time-of-flight (ToF) sensor, or an orientation sensor.

6. The image display device of claim 5, wherein the memory stores one or more instructions which, when executed by at least one processor, cause the image display device to receive, from the server, via the communication circuit, the first virtual scenario selected by determining, based on the gesture, an intention of the user.

7. The image display device of claim 1, wherein the plurality of virtual scenarios comprises virtual scenarios associated with guidance on use of a function of the at least one external device, an internal structure of the at least one external device when disassembled, replacement of a part in the at least one external device, and/or repair of the at least one external device.

8. The image display device of claim 1, wherein the sensing data is input into a model of the server to be used to train the model to learn, from the sensing data, a frequency of proximity between a hand of the user performing the gesture and the at least one external device, a shape of the hand, and a position pattern between the hand and the at least one external device, and the first virtual scenario is selected from among the plurality of virtual scenarios using the trained model.

9. The image display device of claim 1, wherein the memory stores one or more instructions which, when executed by at least one processor, cause the image display device to display, via the display, the virtual reality image showing at least one of a method of using the at least one external device, a method of disassembling the at least one external device, a method of replacing a part in the at least one external device, or a method of repairing the at least one external device, according to the first virtual scenario.

10. The image display device of claim 1, wherein the memory stores one or more instructions which, when executed by at least one processor, cause the image display device to display, via the display, the virtual reality image showing a modified form of the at least one external device according to the first virtual scenario.

11. A display method of an image display device, the method comprising:

obtaining, via a sensor of the image display device, a first position of at least one external device, and a second position of a user;

recognizing a gesture of the user directed to the at least one external device;

transmitting, to a server, via a communication circuit of the image display device, sensing data associated with the first position, the second position, and the gesture of the user;

receiving, from the server, via the communication circuit, a first virtual scenario selected, based on the sensing data, from among a plurality of virtual scenarios associated with the at least one external device; and displaying, on a display of the image display device, a virtual reality image that reflects the first virtual scenario.

12. The method of claim 11, wherein memory of the image display device stores identification information associated with a type of the at least one external device.

13. The method of claim 11, wherein the sensor unit comprises an ultra-wideband (UWB) sensor.

14. The method of claim 13, wherein the UWB sensor is configured to obtain the first position by detecting a first tag attached to the at least one external device, and obtain the second position by detecting a second tag attached to the user.

15. The display-method of claim 11, wherein the sensor comprises at least one of an image sensor, a distance sensor, a time-of-flight (ToF) sensor, or an orientation sensor.

16. A non-transitory computer-readable storage medium storing instructions which, when executed by at least one processor of an image display device, cause the image display device to:

obtain, via a sensor of the image display device, a first position of at least one external device, and a second position of a user;

recognize a gesture of the user directed to the at least one external device;

transmit, to a server, via a communication circuit of the image display device, sensing data associated with the first position, the second position, and the gesture of the user;

receive, from the server, via the communication circuit, a first virtual scenario selected, based on the sensing data, from among a plurality of virtual scenarios associated with the at least one external device; and display, on a display of the image display device, a virtual reality image that reflects the first virtual scenario.

17. The image display device of claim 1, wherein the memory stores one or more instructions which, when executed by at least one processor, cause the image display device to:

obtain, via the sensor, the first position of the at least one external device by detecting a first tag attached to the at least one external device, and obtain, via the sensor, the second position of the user by detecting a second tag attached to the user.

18. The method of claim 11, wherein the obtaining of the first position of the at least one external device and the second position of the user comprises:

obtaining, via the sensor, the first position of the at least one external device by detecting a first tag attached to the at least one external device, and obtaining, via the sensor, the second position of the user by detecting a second tag attached to the user.

* * * * *